(12) United States Patent
Davis et al.

(10) Patent No.: US 12,192,615 B2
(45) Date of Patent: Jan. 7, 2025

(54) METHOD AND APPARATUS FOR USING A PERSONAL ELECTRONIC DEVICE AS A MEASUREMENT DEVICE

(71) Applicants: Cheston Davis, Beaver, UT (US); Tracy Davis, Beaver, UT (US); Kiara Neilsen, Orem, UT (US); Cade Wilson, Ardmore, OK (US)

(72) Inventors: Cheston Davis, Beaver, UT (US); Tracy Davis, Beaver, UT (US); Kiara Neilsen, Orem, UT (US); Cade Wilson, Ardmore, OK (US)

( * ) Notice: Subject to any disclaimer, the term of this patent is extended or adjusted under 35 U.S.C. 154(b) by 348 days.

(21) Appl. No.: 17/866,487

(22) Filed: Jul. 16, 2022

(65) Prior Publication Data

US 2023/0015674 A1 Jan. 19, 2023

Related U.S. Application Data

(63) Continuation of application No. 29/799,933, filed on Jul. 17, 2021, now Pat. No. Des. 1,018,623.

(60) Provisional application No. 63/222,979, filed on Jul. 17, 2021.

(51) Int. Cl.
| | |
|---|---|
| H04N 5/232 | (2006.01) |
| G06T 7/60 | (2017.01) |
| G06T 7/80 | (2017.01) |
| H04M 1/72436 | (2021.01) |
| H04N 23/63 | (2023.01) |
| H04N 23/69 | (2023.01) |

(52) U.S. Cl.
CPC ............ *H04N 23/632* (2023.01); *G06T 7/60* (2013.01); *G06T 7/80* (2017.01); *H04M 1/72436* (2021.01); *H04N 23/69* (2023.01); *G06T 2207/10056* (2013.01); *H04M 2250/52* (2013.01)

(58) Field of Classification Search
None
See application file for complete search history.

(56) References Cited

U.S. PATENT DOCUMENTS

| | | | | |
|---|---|---|---|---|
| 5,631,667 A | * | 5/1997 | Cadwell | A61B 5/369 345/157 |
| 6,072,484 A | * | 6/2000 | Kuroda | G06F 40/183 715/808 |
| 2012/0081546 A1 | * | 4/2012 | Matsumoto | G02B 21/367 348/135 |

(Continued)

*Primary Examiner* — Tuan S Nguyen
(74) *Attorney, Agent, or Firm* — James A. Italia; Italia IP

(57) ABSTRACT

A method of viewing a live image from a microscope through a camera lens of a first personal electronic device is described. The method includes receiving one or more optic powers of a microscope taking the live image entered into a first graphical user interface displayed on a screen of the first personal electronic device, and projecting a measurement tool on a second graphical user interface displayed on the screen of the first personal electronic device with units of measurement based on the entered optic powers. One or more non-transitory, computer-readable storage media and a computer or computer system are also described. Hardware designed to connect a personal electronic device such as a smartphone to a microscope for viewing of a live microscope image through the camera lens of the personal electronic device is also described.

14 Claims, 46 Drawing Sheets

(56) References Cited

U.S. PATENT DOCUMENTS

| | | | | |
|---|---|---|---|---|
| 2014/0152794 | A1* | 6/2014 | Takahashi | G01B 11/2531 348/79 |
| 2017/0328842 | A1* | 11/2017 | Otani | G01N 21/95607 |
| 2020/0183137 | A1* | 6/2020 | Hu | G02B 21/34 |
| 2021/0090238 | A1* | 3/2021 | Gallagher-Gruber | G01N 15/0625 |

* cited by examiner

METHOD AND APPARATUS FOR USING A PERSONAL ELECTRONIC DEVICE AS A MEASUREMENT DEVICE

CROSS-REFERENCE TO RELATED APPLICATIONS

The present application relies on the disclosure of and claims priority to and the benefit of the filing date of U.S. Provisional Patent Application No. 63/222,979, filed Jul. 17, 2021 which is hereby incorporated by reference in its entirety. The present application is also a continuation application of U.S. Design patent application Ser. No. 29/799,933, filed on Jul. 17, 2021 which is incorporated by reference in its entirety.

FIELD

The present disclosure is directed to the field of microscopy. More particularly, the present disclosure relates to an application of a personal electronic device such as a smartphone as well as hardware for facilitating the capture, measurement, and sharing of microscopic images taken from the camera of the personal electronic device.

BACKGROUND

Light microscopy has various applications including use in teaching biology, research, and clinical diagnosis. Traditionally, images captured from a microscope have been shared with others by distributing or projecting photographs of the images after the photographs were taken. Digital microscopes that can transmit a microscopy image to a screen of a computing device such as a smartphone during use have more recently entered the market, but these require specialized digital lenses and merely use the screen of the computing device as a display as opposed to capturing, measuring, and sharing a microscopy image directly from a conventional light microscope using the camera and other components of the computing device.

SUMMARY

In general, in a first aspect, the disclosure features a method of viewing a live image from a microscope through a camera lens of a first personal electronic device. The method includes receiving one or more optic powers of a microscope taking the live image entered into a first graphical user interface displayed on a screen of the first personal electronic device, and projecting a measurement tool on a second graphical user interface displayed on the screen of the first personal electronic device with units of measurement based on the entered optic powers.

In general, in a second aspect, the disclosure features one or more non-transitory, computer-readable storage media. The one or more non-transitory, computer-readable storage media have instructions for execution by one or more processors, the instructions programmed to cause the one or more processors to execute steps of a method of viewing a live image from a microscope through a camera lens of a first personal electronic device. The steps include receiving one or more optic powers of a microscope taking the live image entered into a first graphical user interface displayed on a screen of the first personal electronic device, and projecting a measurement tool on a second graphical user interface displayed on the screen of the first personal electronic device with units of measurement based on the entered optic powers.

In general, in a third aspect, the disclosure features a computer or computer system. The computer or computer system includes one or more processors designed to execute instructions, and one or more non-transitory, computer-readable memories storing program instructions for execution by the one or more processors. The instructions are programmed to cause the one or more processors to execute steps of a method of viewing a live image from a microscope through a camera lens of a first personal electronic device. The steps include receiving one or more optic powers of a microscope taking the live image entered into a first graphical user interface displayed on a screen of the first personal electronic device, and projecting a measurement tool on a second graphical user interface displayed on the screen of the first personal electronic device with units of measurement based on the entered optic powers.

Features of the method, the one or more non-transitory, computer-readable storage media, and the computer or computer system can include the following. The one or more optic powers can include an objective power and an ocular power. A calibration factor entered into the first graphical user interface can be received. The entered objective power, ocular power, and calibration factor can be factored into a formula which determines the units of measurement of the measurement tool. The units of measurement can be chosen from units including centimeters, millimeters, and micrometers. The measurement tool can be designed to measure dimensions of features within the live image according to an x-axis measurement and a y-axis measurement. The measurement tool can be calibrated by capturing a microscopic image of a measurement scale, and adjusting the calibration factor so that graduations of the measurement scale correspond in distance there between with graduations of the measurement tool. A magnification power can be displayed after the one or more optic powers of the microscope are entered. The live image can be shared with a second personal electronic device or multiple personal electronic devices by streaming the live image. The live image can be streamed from the first personal electronic device to the second personal electronic device in a manner that allows audio or text communication between a user of the first personal electronic device and a user of the second personal electronic device. The streaming can include sharing a URL hyperlink hosting a streamed image between the first personal electronic device and the second personal electronic device. The live image can be streamed from the first personal electronic device to multiple personal electronic devices. The streaming can include sharing a URL hyperlink hosting a streamed image between the first personal electronic device and the multiple personal electronic devices.

It should be understood that the method, the one or more non-transitory, computer-readable storage media, and the computer or computer system are not to be considered limitations on the invention defined by the claims. The featured method, one or more non-transitory, computer-readable storage media, and computer or computer system can be implemented in one or more ways using one or more features depicted in the drawings, described in the detailed description, and set forth in the claims.

BRIEF DESCRIPTION OF THE DRAWINGS

The accompanying drawings illustrate certain aspects and principles of the implementations set forth, and should not be construed as limiting.

DETAILED DESCRIPTION

Figure 1:
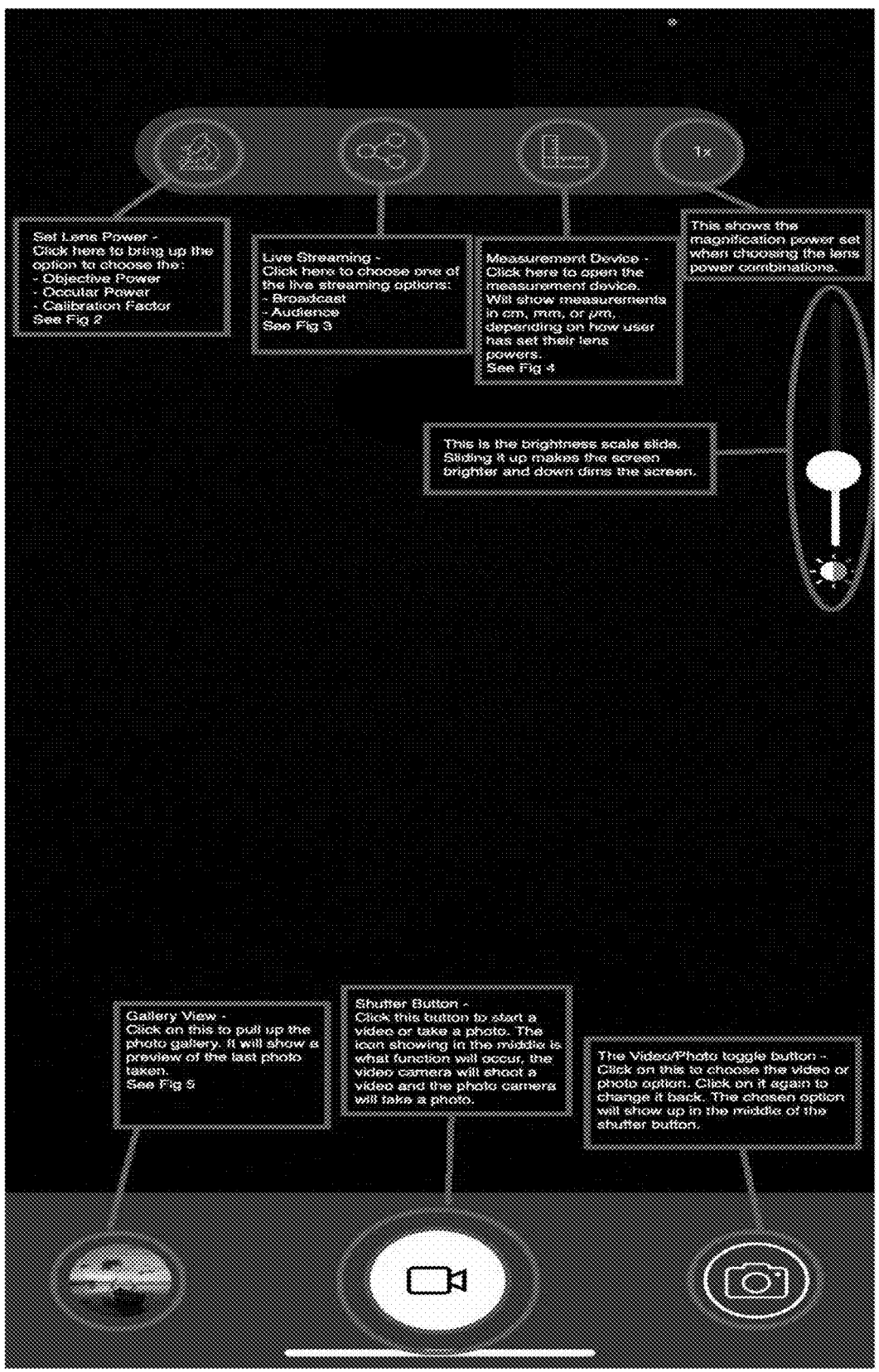
FIG. 1 is a screenshot of a graphical user interface of an application for capturing microscopy images from a portable computing device showing a top menu bar and bottom menu bar according to one implementation.

Reference will now be made in detail to various illustrative implementations. It is to be understood that the following discussion of the implementations is not intended to be limiting.

The disclosure provides a connector and adapter designed to allow images from a microscope to be captured on a portable computing device or personal electronic device such as a smartphone. The connector includes a phone holder and an adapter holder. The phone holder is designed to hold a phone securely such that the camera of the phone is in alignment with a hole in the adapter holder. The adapter is designed with a bore with an adjustable diameter that can accommodate microscope eyepieces of various sizes and hold them securely by a friction fit connection. The adapter holds the eyepiece of the microscope and is designed to fit securely in the adapter holder of the connector with deformable portions that allow the adapter to snap in place into the adapter holder. The phone is positioned to receive video or images from the microscope within the phone camera when the adapter is secured in the adapter holder of the connector and the eyepiece of the adapter is inserted into an ocular of a microscope. In this way, the camera of the phone is in alignment with the hole in the adapter holder, the eyepiece secured in the adapter, and the ocular of the microscope holding the eyepiece. The disclosure also provides an application that provides a portable computer/computing device/personal electronic device such as a smartphone with one or more functionalities when images from a conventional light microscope are taken or captured with the camera of the portable computer/computing device/personal electronic device. The functionalities include setting the powers of the optics of the microscope including an objective power, ocular power, and calibration factor to create a formula for the application to set the measurement scale of the application, live streaming and/or recording to allow a user to broadcast or record video footage of the images from the microscope for another individual or multiple individuals, with or without audio, and a measurement functionality to allow the user to apply a measurement scale to the images from the microscope in centimeters, millimeters, and micrometers in both the x-axis and the y-axis. The application also allows for calibration of the scale of the application with a physical scale so that the scale of the measurement tool of the application is accurate. The connector/adapter hardware for capturing images on the portable computing device and the application of the portable computing device can be used together to share microscopic images with another participant or multiple participants as well as measure features within the images.

The following figures depict different implementations of a graphical user interface of a downloadable application and/or a dedicated website capable of performing method implementations described herein. The graphical user interface will be described with respect to specific icons, fields, buttons, and other features which are displayed on a screen or display of a computer or computing device such as a mobile phone and are selectable by a user of the application and/or website by way of a touchscreen or other input device such as a pen or stylus and provide for input. Selection of the icons and other features by a user activates certain method steps for performing various functions executable as computer program instructions on a stationary computer or portable computer/computing device. These computer program instructions may be provided to one or more processor (s) of a general-purpose computer, special purpose computer, or other programmable data processing device or combination of devices, such that the instructions, which execute via the processor or processors of the computer or other programmable data processing device(s), create means for implementing the method steps. As such, methods described herein can be performed as a series of steps which are implemented as computer-readable code, computer-readable instructions, computer-executable instructions, or "software" performed by one or more processor(s). Such software can be loaded onto a memory or memories of a computer, portable computer/computing device, or system or combination thereof, as an application or program (or multiple applications and/or programs) capable of performing one or more steps of the method implementations. As can be appreciated, different steps or groups of steps of the method implementations can be performed by different computers or computing devices, or some or all can be performed by a single computer or computing device.

FIG. 1 provides a graphical user interface according to one implementation. The graphical user interface includes a top menu bar and a bottom menu bar. The top menu bar has four icons arranged horizontally. The left-most icon of the top menu has the appearance of a microscope and allows a user to set the lens powers. The user clicks the icon to display an option (shown in subsequent figures) to choose an objective power, an ocular power, and a calibration factor. The second icon from the left at the top menu has the appearance of three connected loops and allows the user to activate live streaming (shown in subsequent figures). Clicking the icon allows the user to choose a live streaming option such as broadcast or audience. The second icon from the right at the top menu has the appearance of a ruler and allows the user to open the measurement device (shown in subsequent figures). The measurement device when opened will show measurements in cm, mm, or µm, depending on how the user has set their lens power. The right-most icon at the top shows the magnification power set (e.g., 1×, 10×) when choosing the lens power combinations. Below the top menu bar at the right is a vertical toggle or slide for adjusting the brightness scale. Sliding the icon up makes the screen brighter and toggling it down dims the screen. The bottom menu bar includes three icons arranged horizontally. The left-most icon at the bottom, gallery view, will display a photo gallery when activated. The icon shows a preview of the last photo taken. The middle icon at the bottom provides a shutter button. Clicking the shutter button starts a video or takes a photo. The icon shown indicates what function should occur (a video camera will shoot a video and a photo camera will take a photo). The right-most icon provides a photo/video toggle button-clicking on it each time will choose from video to audio and back to video again. The chosen option will display on the shutter button icon.

Figure 2:
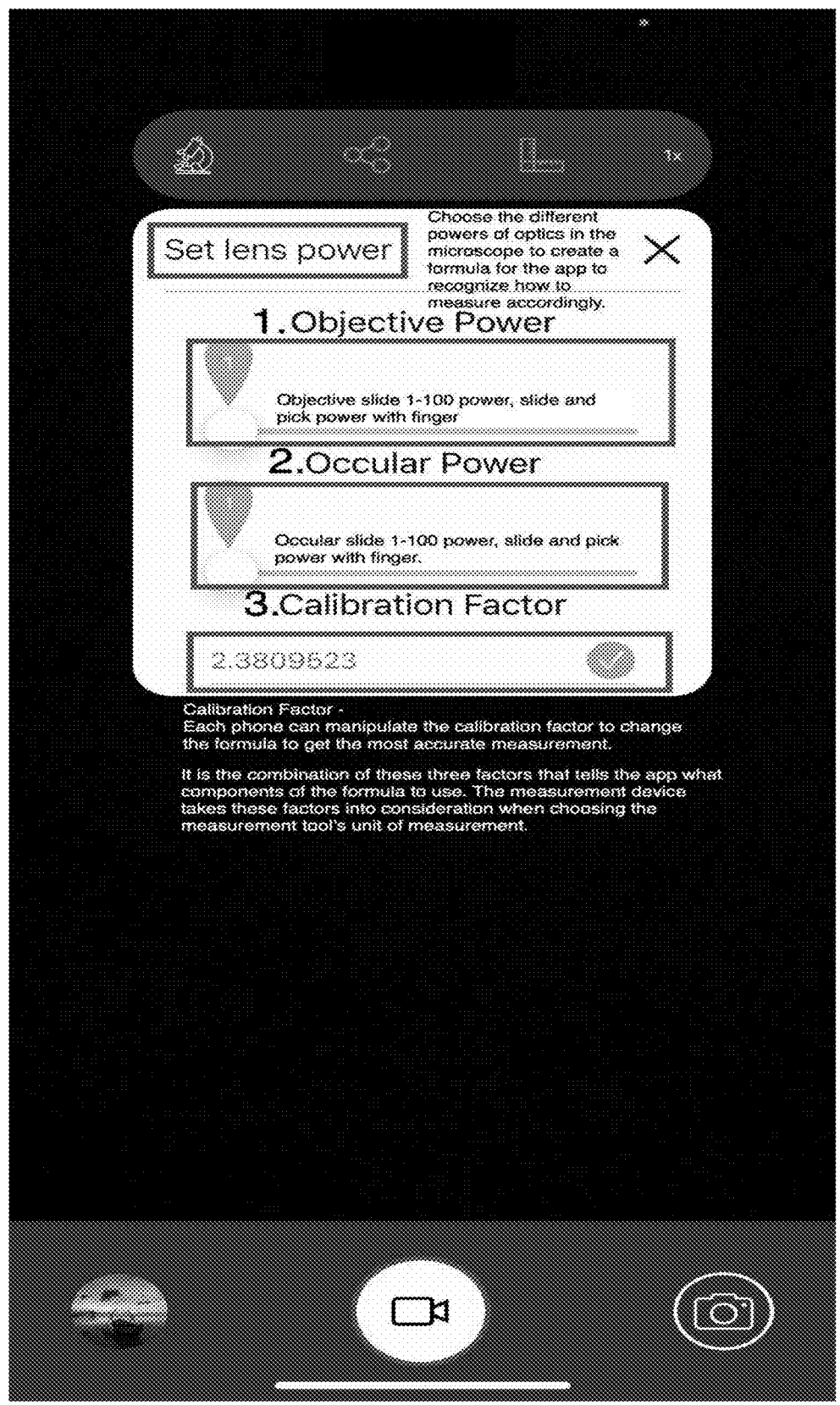
FIG. 2 is a screenshot of a graphical user interface of an application for capturing microscopy images that provides capability for setting the lens powers or calibration factor according to one implementation.

FIG. 2 provides a graphical user interface that opens when the user selects the lens power icon in FIG. 1, which is highlighted at the top menu bar indicating it has been selected. The interface displays three fields stacked vertically, the top-most allowing the objective power to be set, the middle field allowing the ocular power to be set, and the bottom-most allowing the calibration factor to be set. The objective power field provides a slide that allows the user to set an objective power from 1 to 100 with their finger on a touchscreen. The ocular power field below that provides a slide that allows the user to set an ocular power from 1 to 100 with their finger. A calibration factor field at the bottom allows the user of the application to manipulate the calibration factor to change the formula to get the most accurate measurement. The calibration factor can be typed in manually. The combination of the objective power, ocular power, and calibration factor instruct the application as to what components of the formula to use. The measurement device takes these factors into consideration by way of the formula when choosing the measurement tool's unit of measurement. Said formula is provided below:

RulerMeasurements.shared.unitSize=*CG*Float(DimensionInfo.pointsPerCentimeter)**CG*Float(RulerMeasurements.shared.magnifcation)**CG*Float(RulerMeasurements.shared.zoomingFactor)/RulerMeasurements.shared.calibrationFactor)

Figure 3:
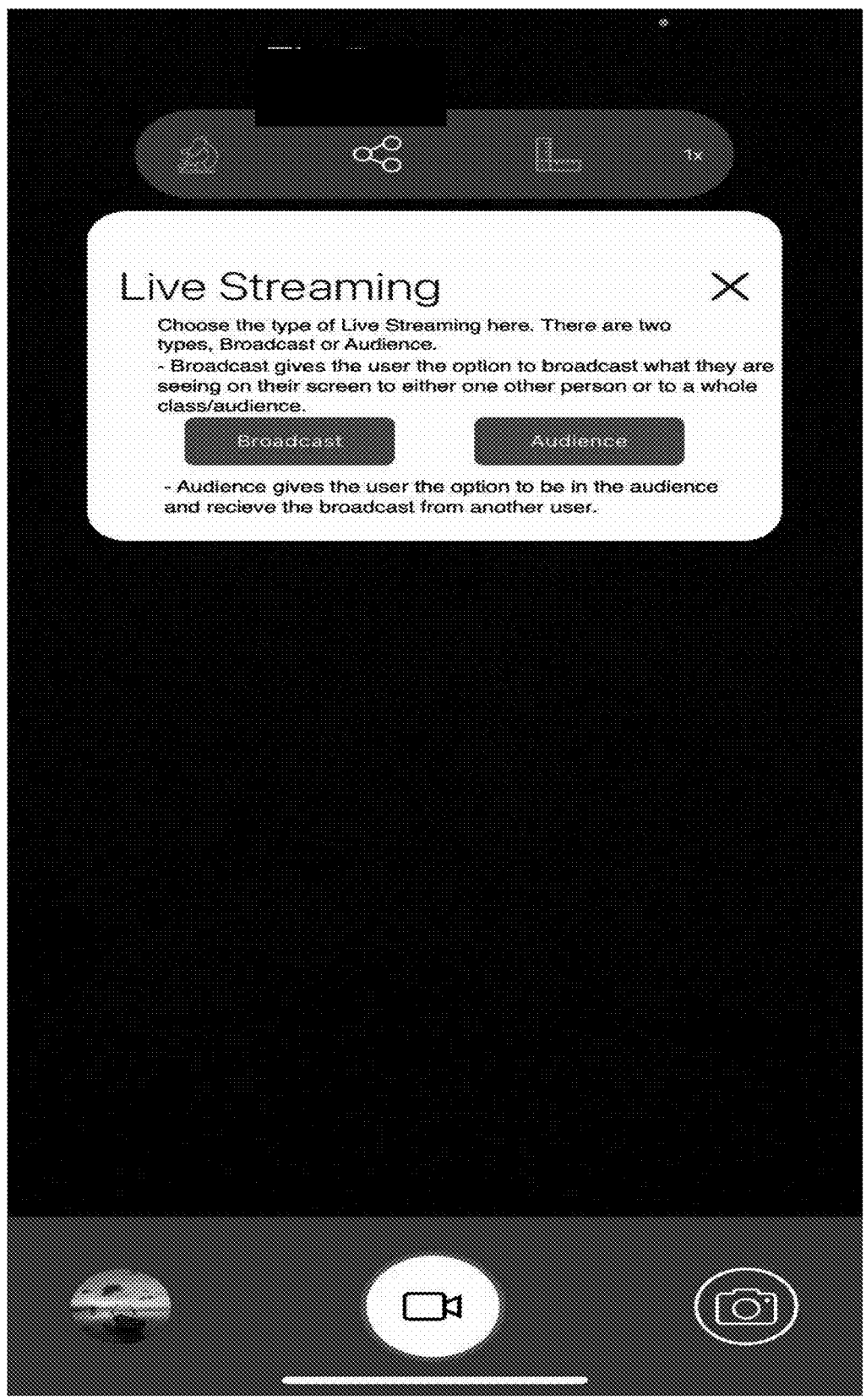
FIG. 3 is a screenshot of a graphical user interface of an application for capturing microscopy images that provides live streaming functionality for sharing images according to one implementation.

FIG. 3 provides a graphical user interface that opens when the user selects the live streaming icon in FIG. 1. The top menu bar shows that the live streaming icon is highlighted, indicating it has been selected. The live streaming icon allows the user to choose between two different types of live streaming options-broadcast or audience. The broadcast option, selectable as the left icon appearing as a button labeled "broadcast", provides the user the option to broadcast what they are seeing on the screen to either one other person or to a whole class/audience of people. The audience option, selectable as the right icon appearing as a button labeled "audience", provides the user the option to be in the audience and receive a broadcast from another user.

Figure 4:
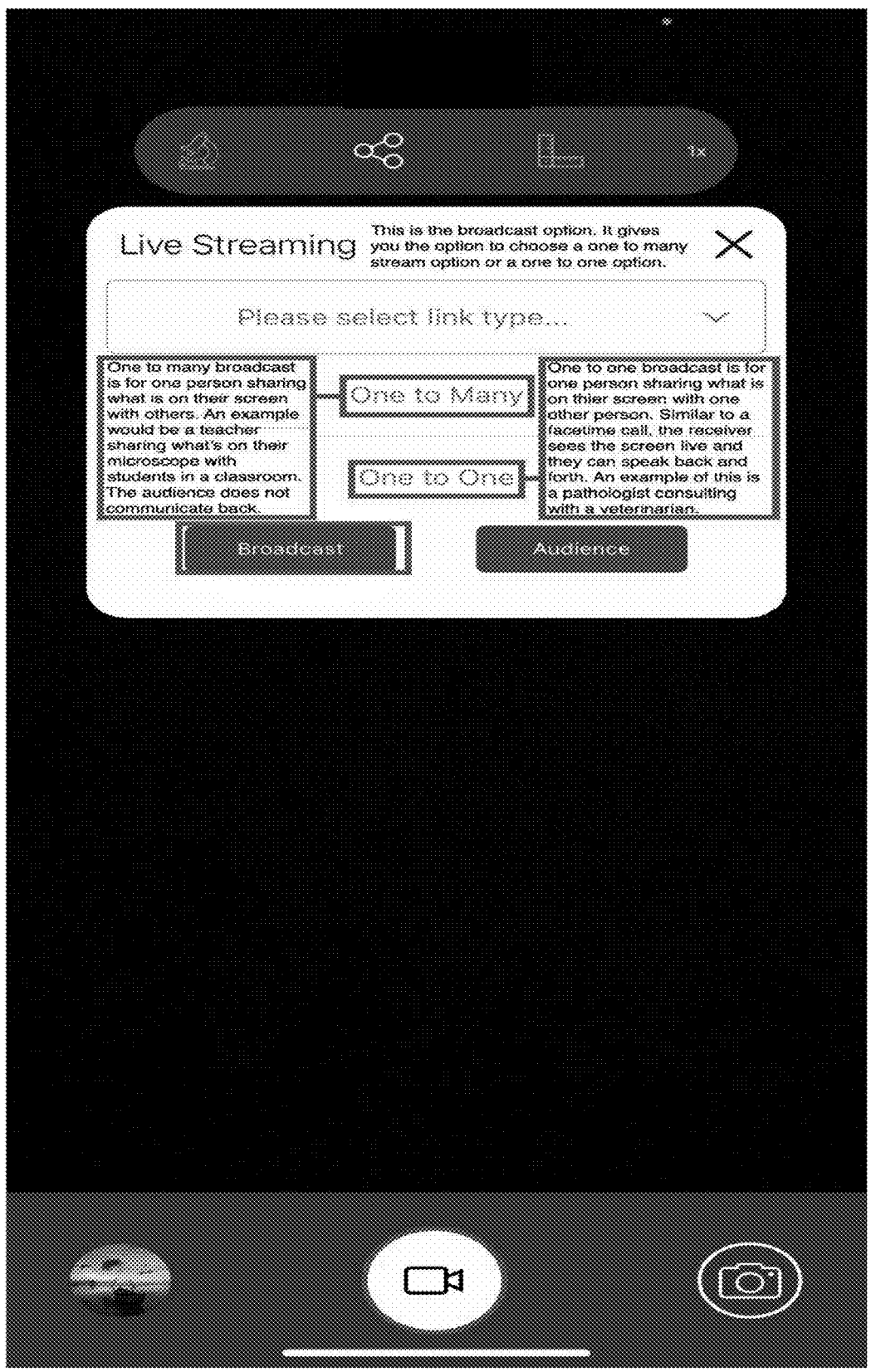
FIG. 4 is a screenshot of a graphical user interface of an application for capturing microscopy images that provides for a one-to-many streaming option and a one-to-one streaming option for sharing images according to one implementation.

FIG. 4 provides a graphical user interface that opens when the user selects the broadcast option in FIG. 3. The broadcast option provides an option to choose a one-to-many stream option at the top of the user interface and a one-to-one stream option below that. The one-to-many broadcast option is for one person sharing what is on their screen with other users. In one example, a teacher shares what's on their microscope with students in a classroom. The audience cannot communicate back with the broadcaster. The one-to-one broadcast option is for one person sharing what is on their screen with one other person. The one-to-one option operates similarly to a Facetime call, where the receiver sees the screen live and both users (sender and receiver) can communicate by audio or text back and forth. One example of this is a pathologist consulting with a veterinarian.

Figure 5:
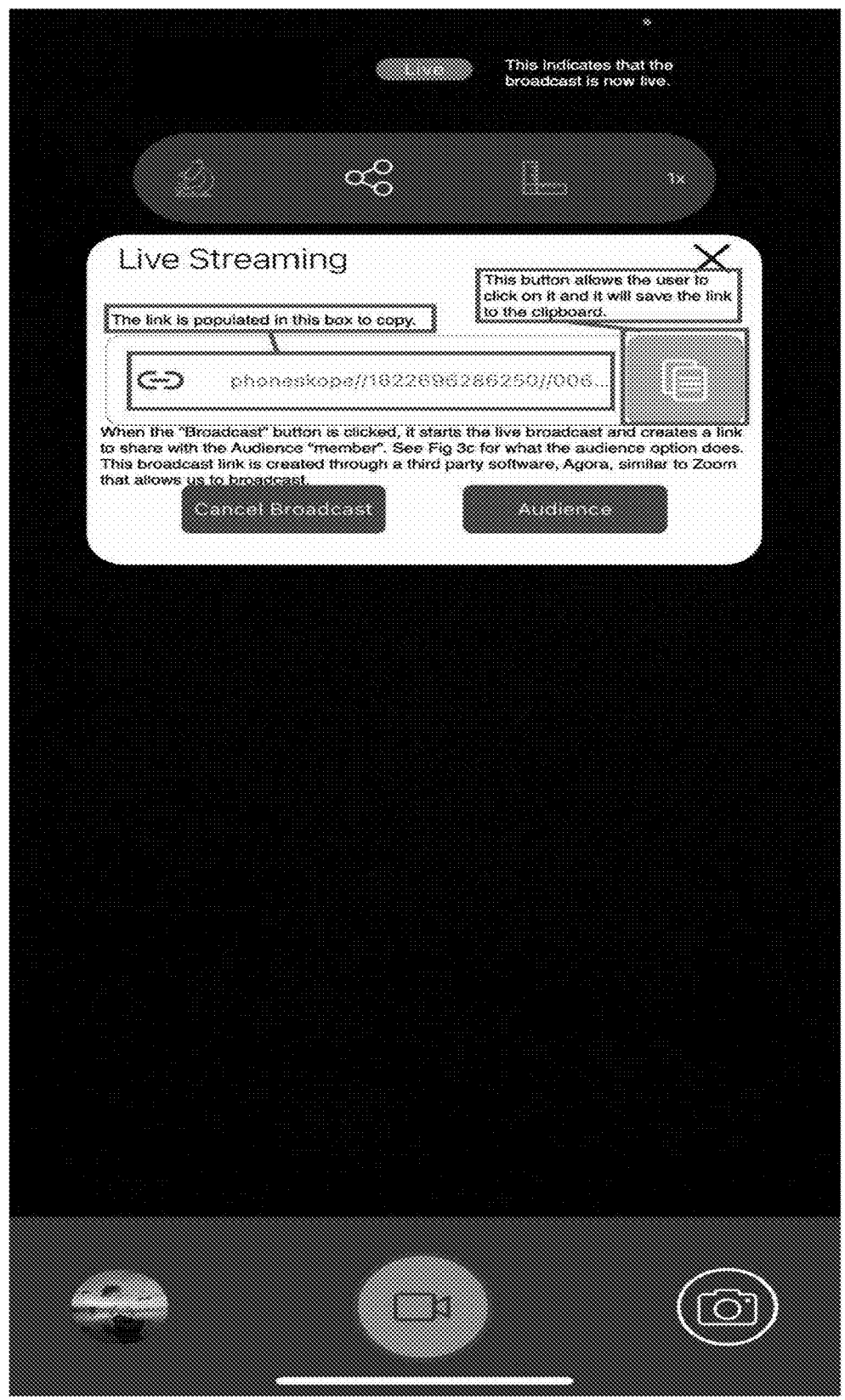
FIG. 5 is a screenshot of a graphical user interface of an application for capturing microscopy images that provides a broadcast hyperlink for sharing images with other users according to one implementation.

FIG. 5 provides a graphical user interface that opens when the broadcast icon in FIG. 4 is selected by the user. At the top of the screen an indicator displays that the broadcast is now live. Below that is the top menu bar showing that the live streaming icon is highlighted, and below that is a box populated with a URL hyperlink. When the broadcast button is clicked, it starts the live broadcast and creates a URL hyperlink to share with the audience member or members. The broadcast hyperlink can be created through a third-party application such as Agora™, similar to Zoom, that provides for broadcasting or streaming capability. The third-party application can create a one-to-one live communication similar to Facetime or Skype, or create a one-to-many live broadcast similar to Facebook and YouTube Live. Alternatively, or in addition, the third-party application can include one or more of these platforms for streaming. The third-party application can be implemented through a software development kit (SDK) that provides broadcasting or streaming functionality to the microscope user's application, or through an embedded application program interface (API). The icon to the right of the hyperlink allows the user to copy the hyperlink and save it to the clipboard of the personal electronic device. At the bottom left is a button to cancel the broadcast.

Figure 6:
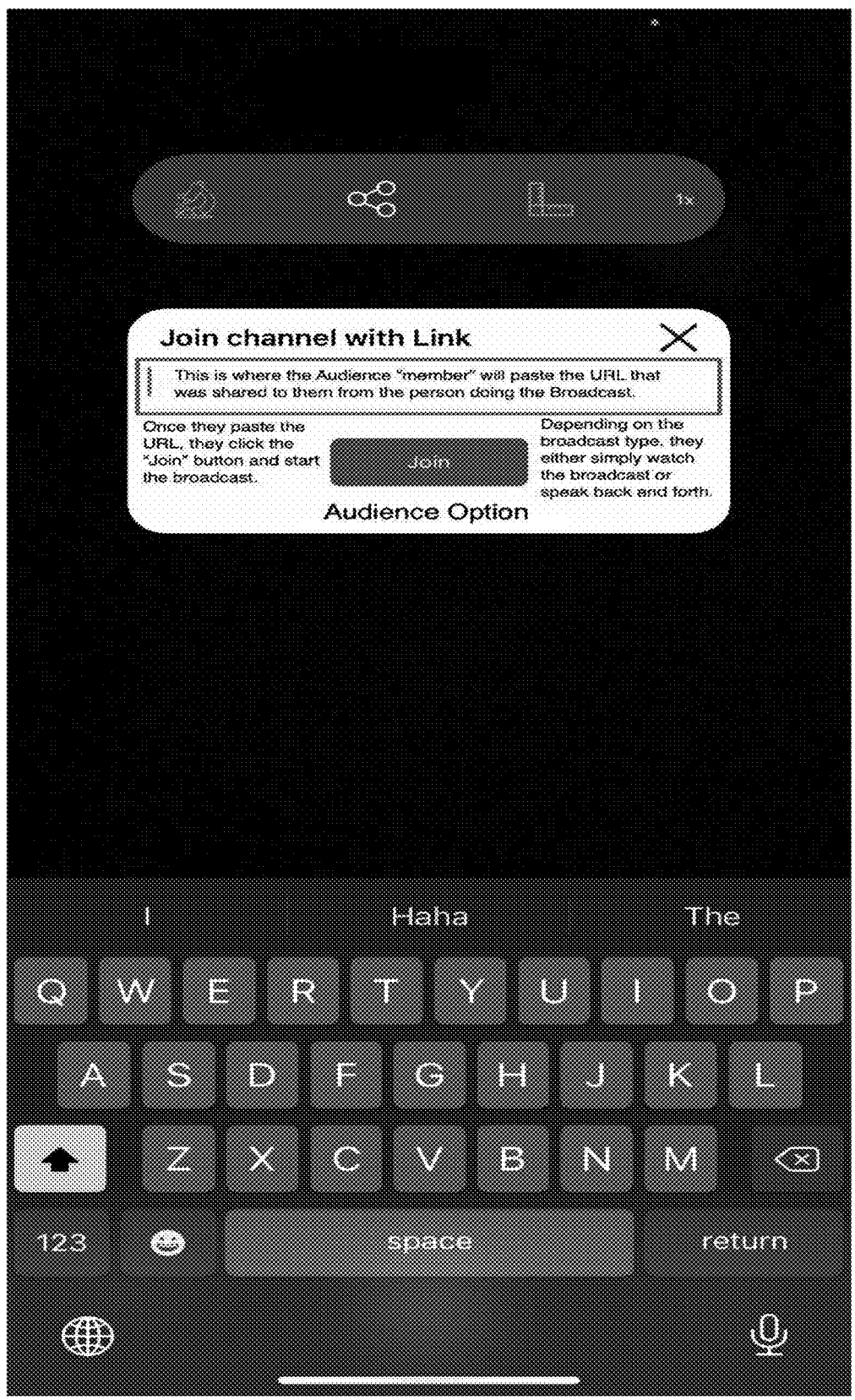
FIG. 6 is a screenshot of a graphical user interface of an application for capturing microscopy images that allows an audience member to join a broadcast according to one implementation.

FIG. 6 provides a graphical user interface that opens when the audience icon in FIG. 4 is selected by the user. Below the top menu bar is a field where the audience member can paste the URL that was shared to them from the user initiating the broadcast. Once they paste the URL, the audience member clicks the Join button below the URL field and starts the broadcast. Depending on the broadcast type, the audience member simply observes the broadcast as one of many observers or can communicate back and forth in a one-to-one communication with the broadcaster. At the bottom of the screen is a condensed QWERTY keyboard for typing in the link manually.

Figure 7:
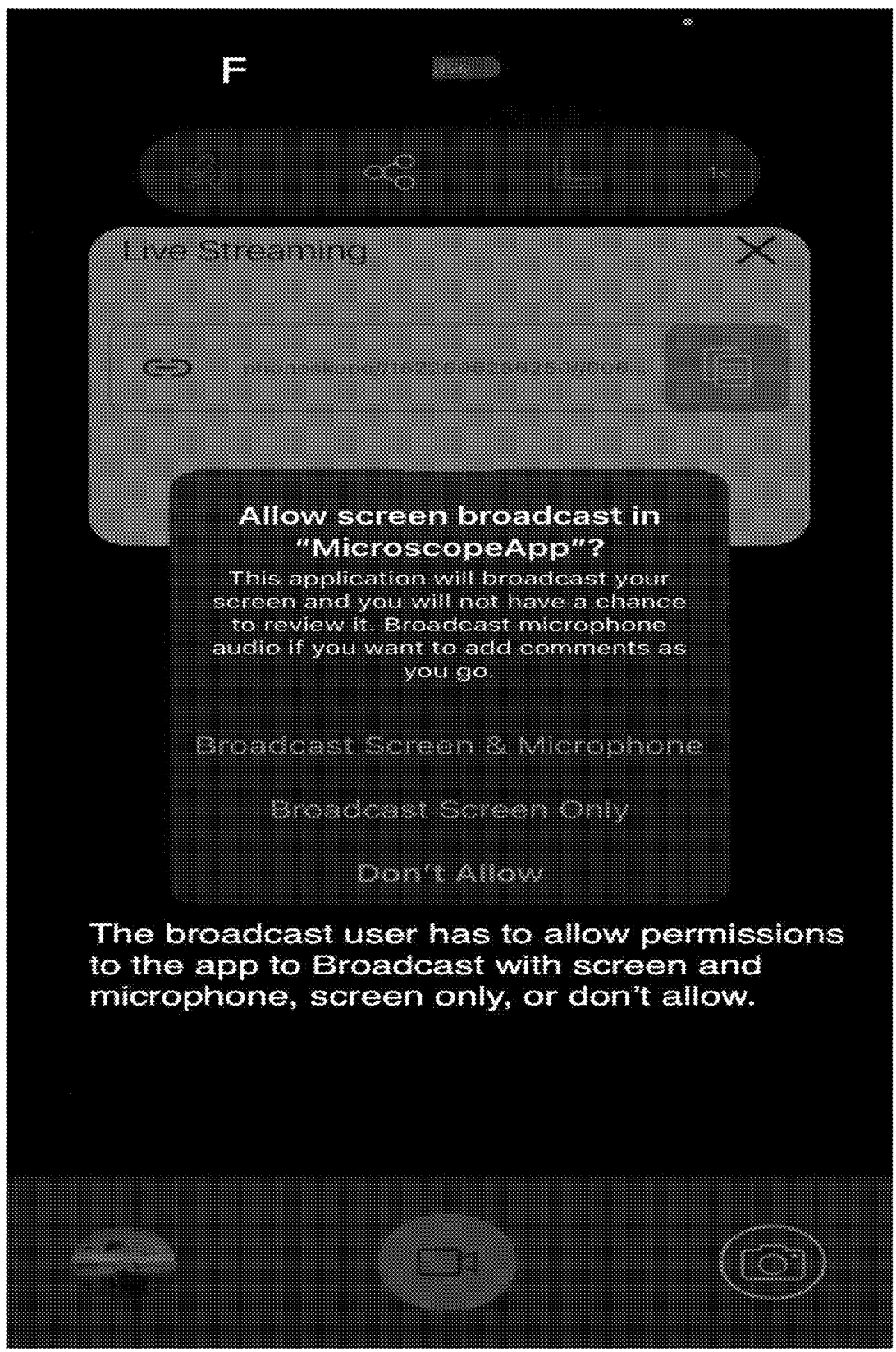
FIG. 7 is a screenshot of a graphical user interface of an application for capturing microscopy images that allows the user to select different options for broadcasting images according to one implementation.

FIG. 7 provides a graphical user interface of a broadcasting user of the application. A message pops up providing three options for permissions for broadcasting: 1) allowing for the application to broadcast with screen and microphone, 2) allowing to broadcast the screen only, or 3) don't allow broadcasting. The popup message warns that the application will broadcast the user's screen and the user will not have a chance to review it, and that microphone audio is available for broadcast if the user wants to add comments during the broadcast.

Figure 8:
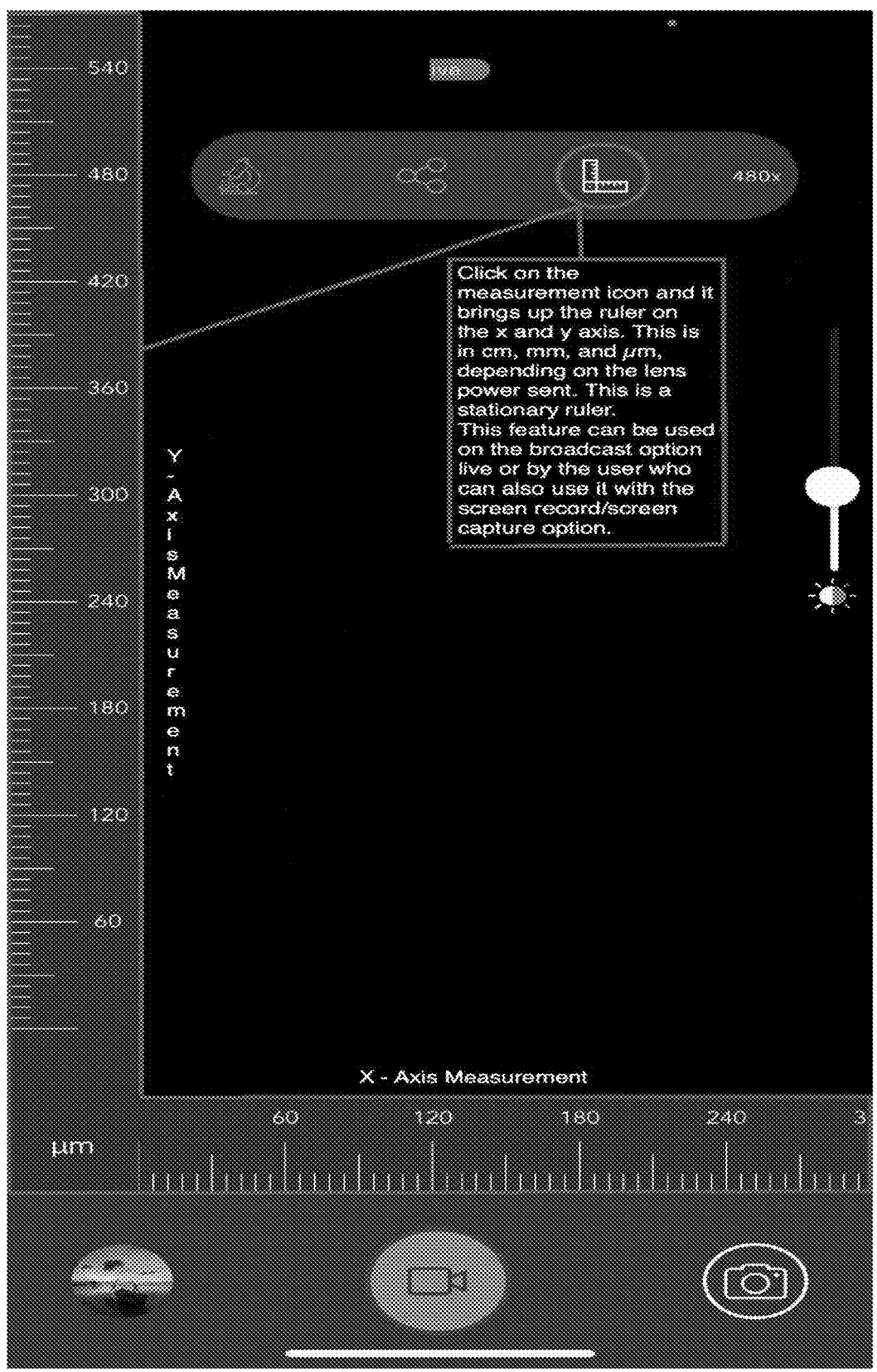
FIG. 8 is a screenshot of a graphical user interface of an application for capturing microscopy images that allows a user to take measurements of the images or their features according to one implementation.
Figure 9:
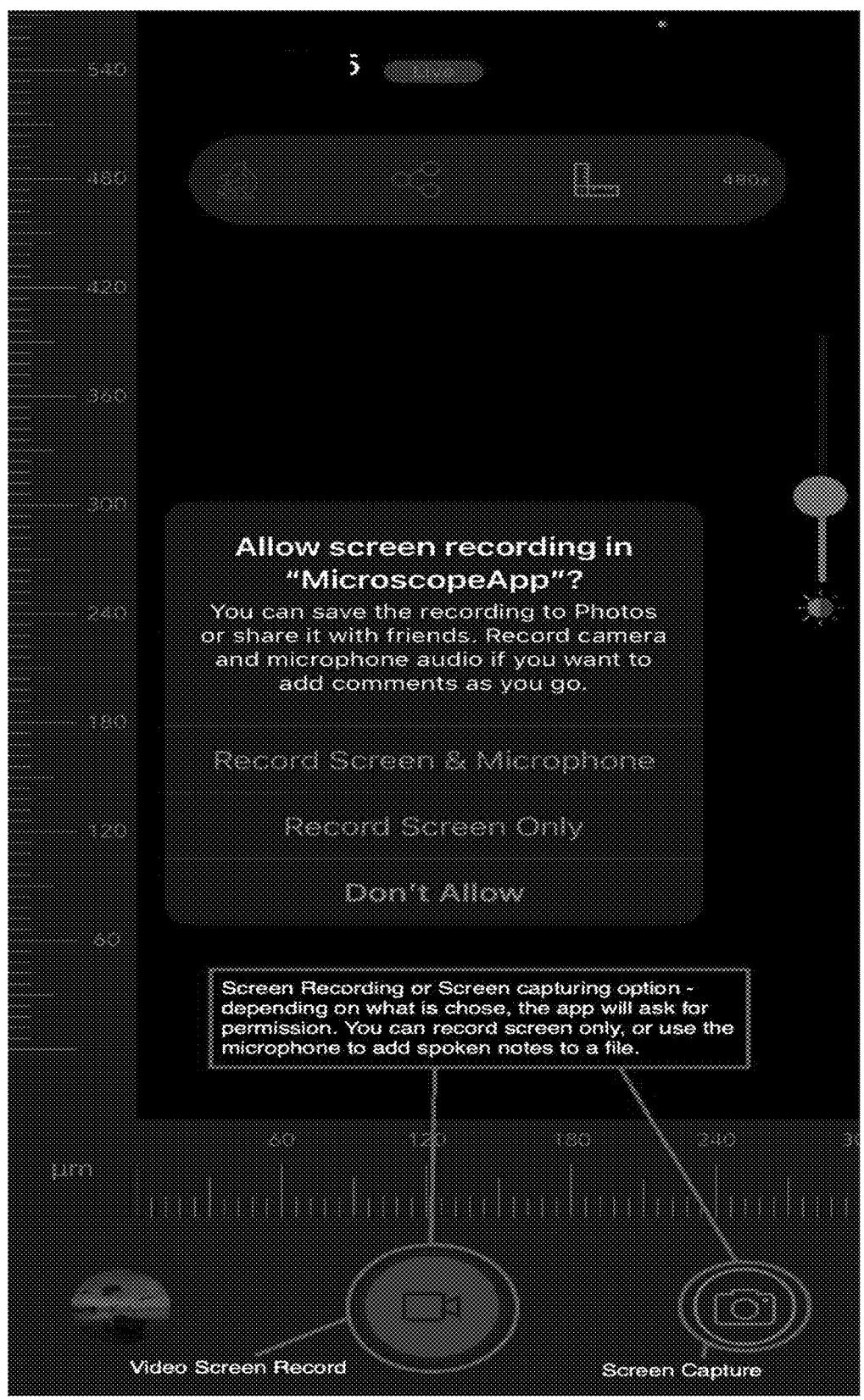
FIG. 9 is a screenshot of a graphical user interface of an application for capturing microscopy images that allows the user to select different options for recording images during measurements according to one implementation.

FIG. 8 provides a graphical user interface that opens when the user selects the measurement icon at the top of the menu, which is shown highlighted at the top menu bar indicating it has been selected. The graphical user interface displays a measurement tool that provides a ruler on both the x and y axis of the screen of the user's personal electronic device. The ruler can display measurements in cm, mm, and μm, depending on the optic powers selected. This is the stationary ruler. The ruler feature can be used on the broadcast live option or on the screen record/screen capture option. In other implementations, the measurement tool includes a draw feature which allows a user to draw a circle, oval, or polygon around a boundary of individual features within the microscopic image to highlight the features. The measurement tool can then provide a length, width, or diameter of the feature that is drawn around, based on the optic powers selected. FIG. 9 provides a graphical user interface of a broadcasting user of the application that shows a pop-up message providing three options for recording permissions: 1) allowing the application to record with screen and microphone 2) allowing the application to record screen only, or 3) don't allow recording when the measurement icon is selected. The pop-up message indicates that the user can save the recording to photos or share it with friends, or record camera and microphone audio if the user wants to add comments during the recording such as spoken notes to a file.

Figure 10:
FIGS. 10-21 are screenshots of graphical user interfaces of an application for capturing microscopy images according to examples of the application during use according to various implementations.
Figure 11:
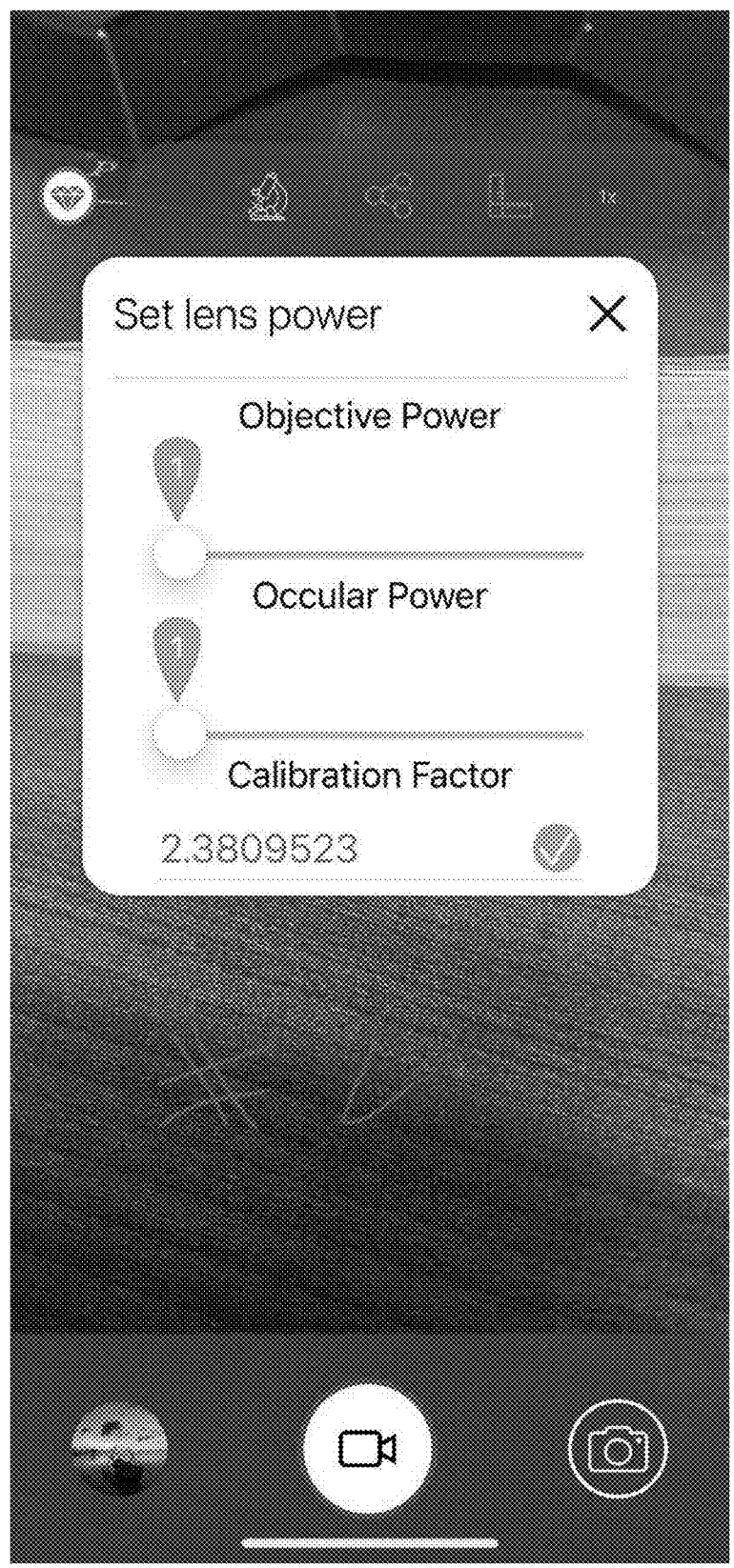
Figure 12:
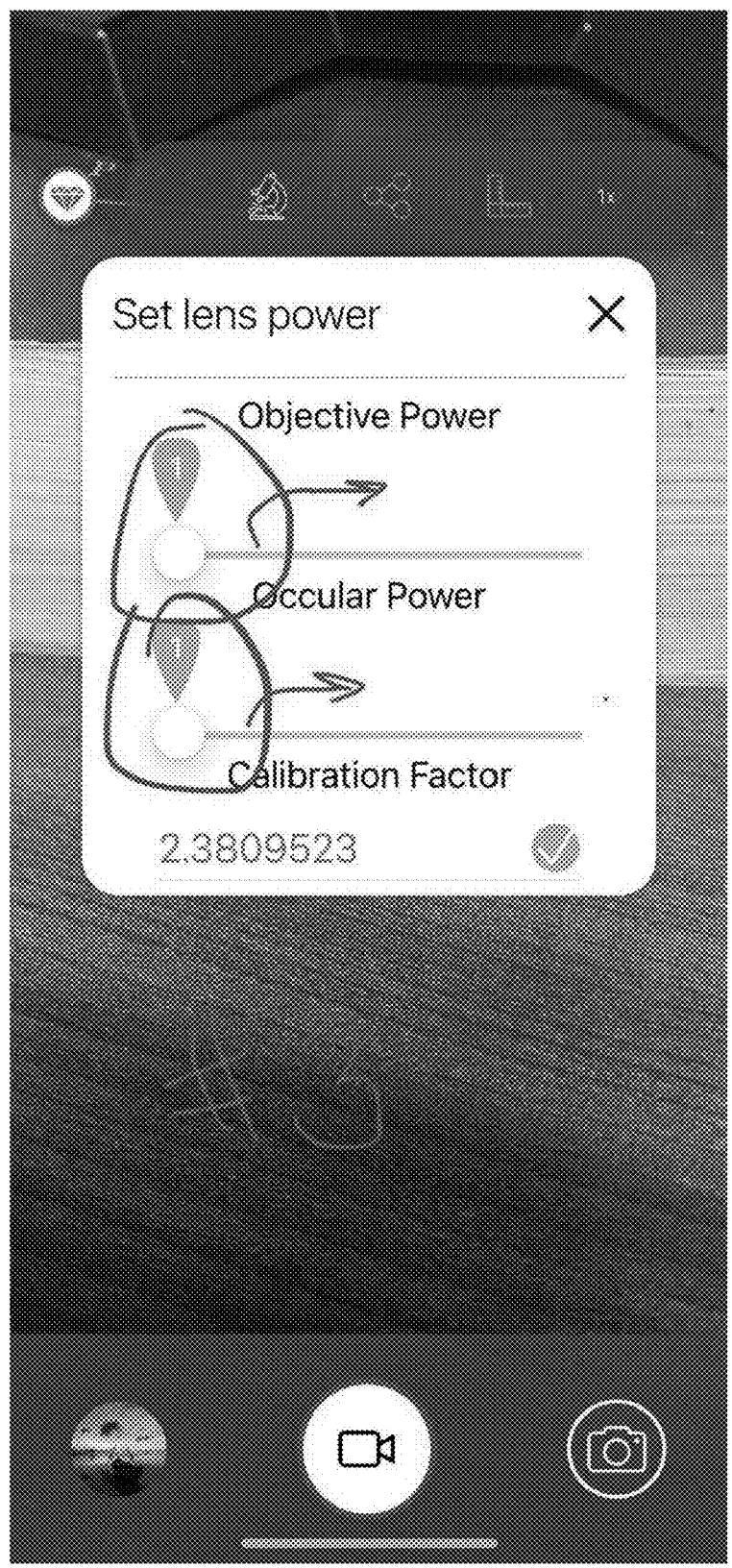
Figure 13:
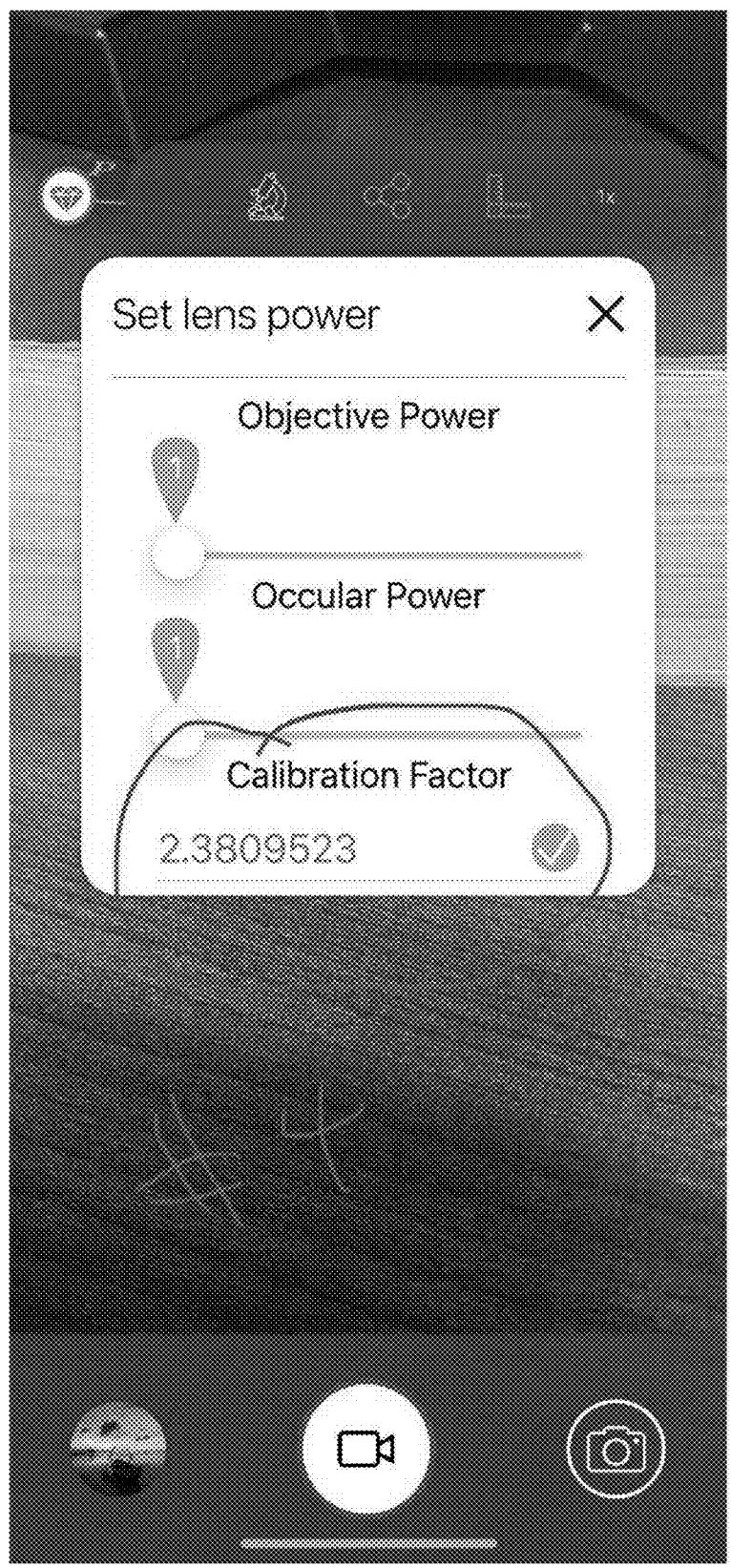
Figure 14:
Figure 15:
Figure 16:
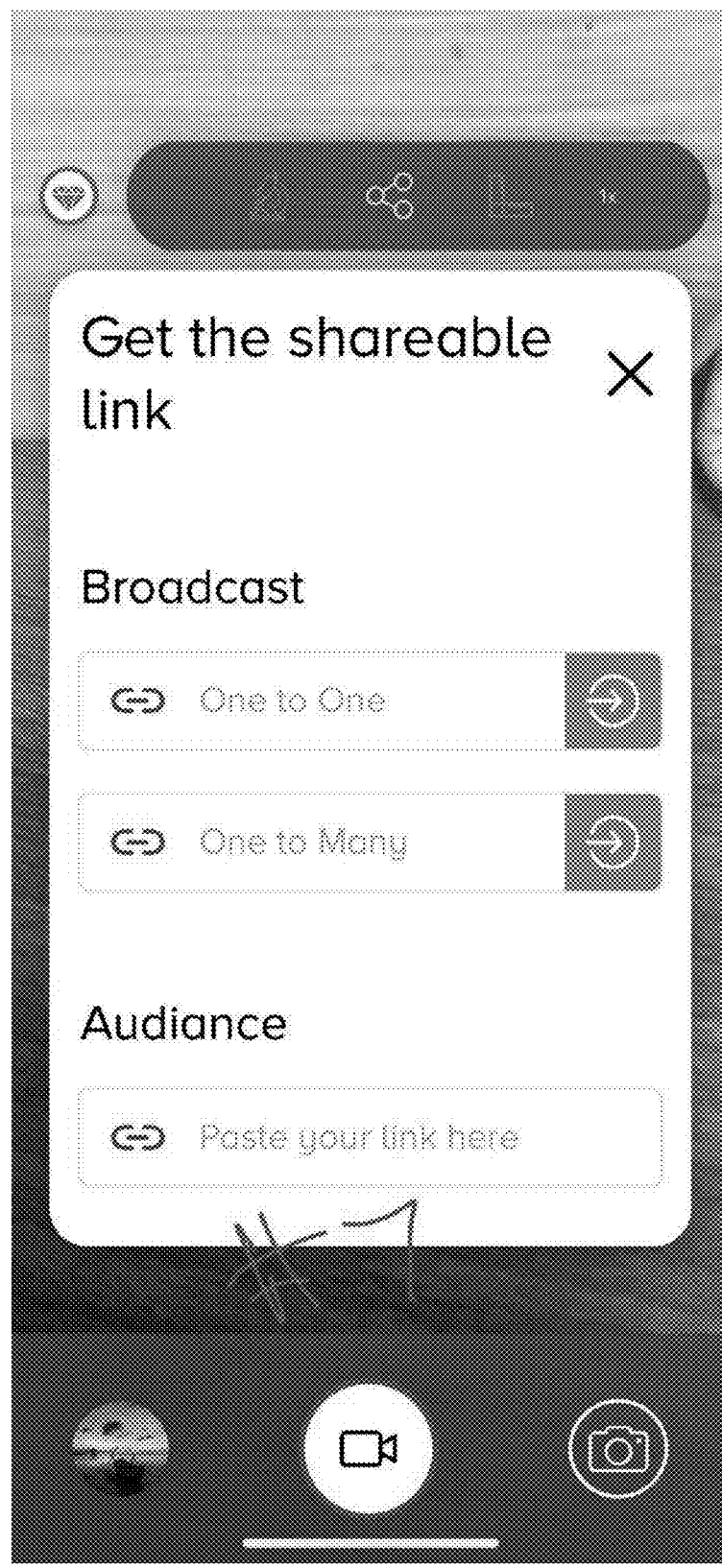
Figure 17:
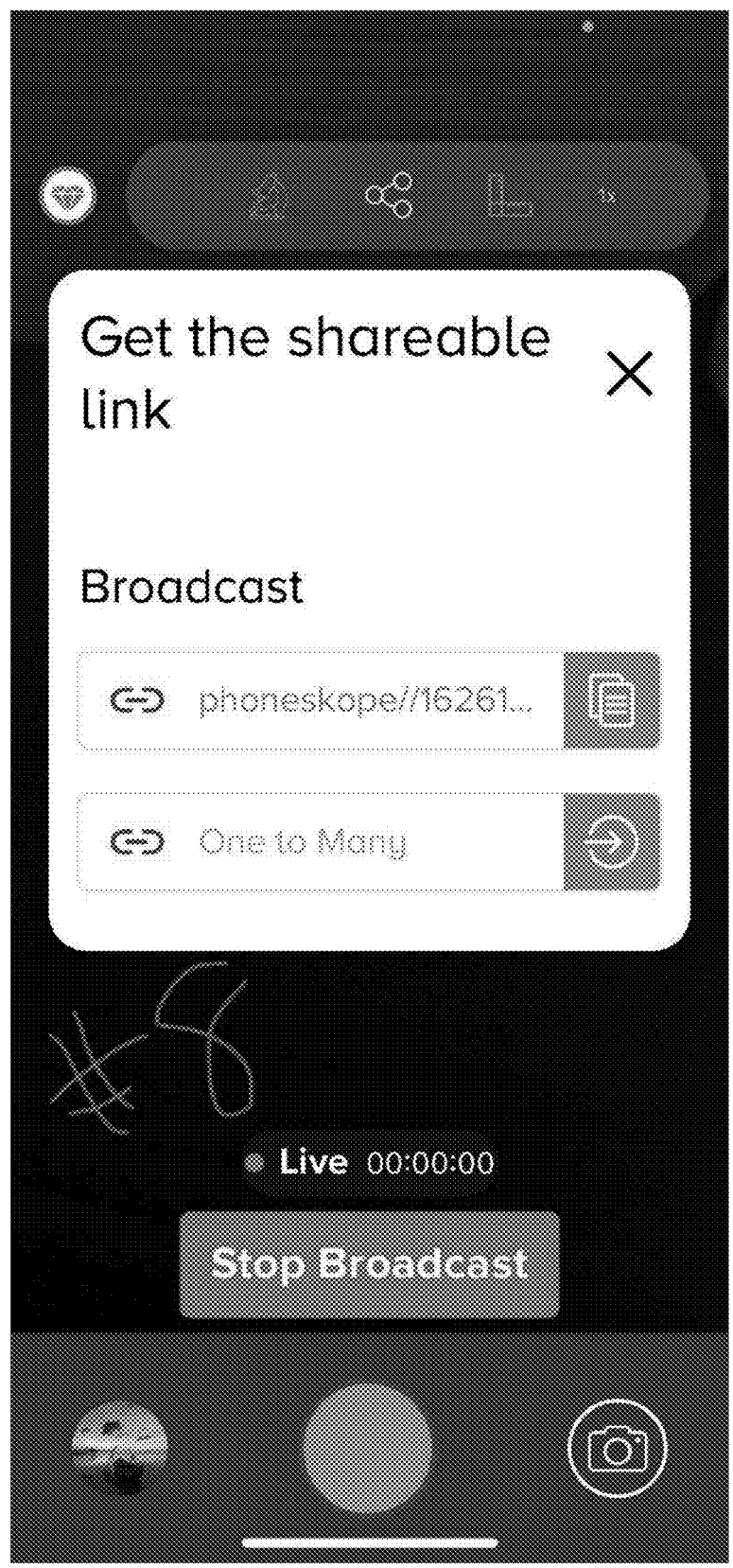
Figure 18:
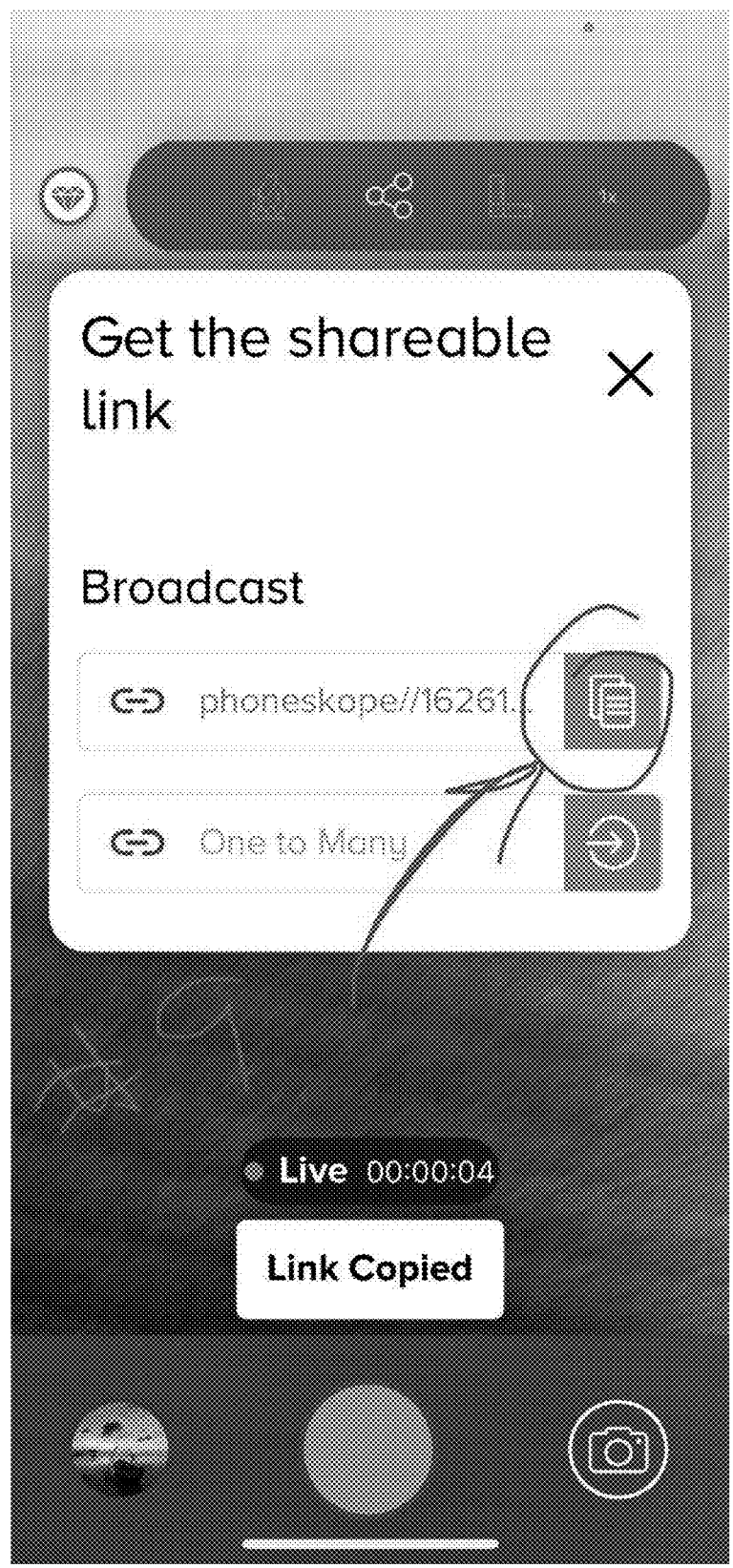
Figure 19:
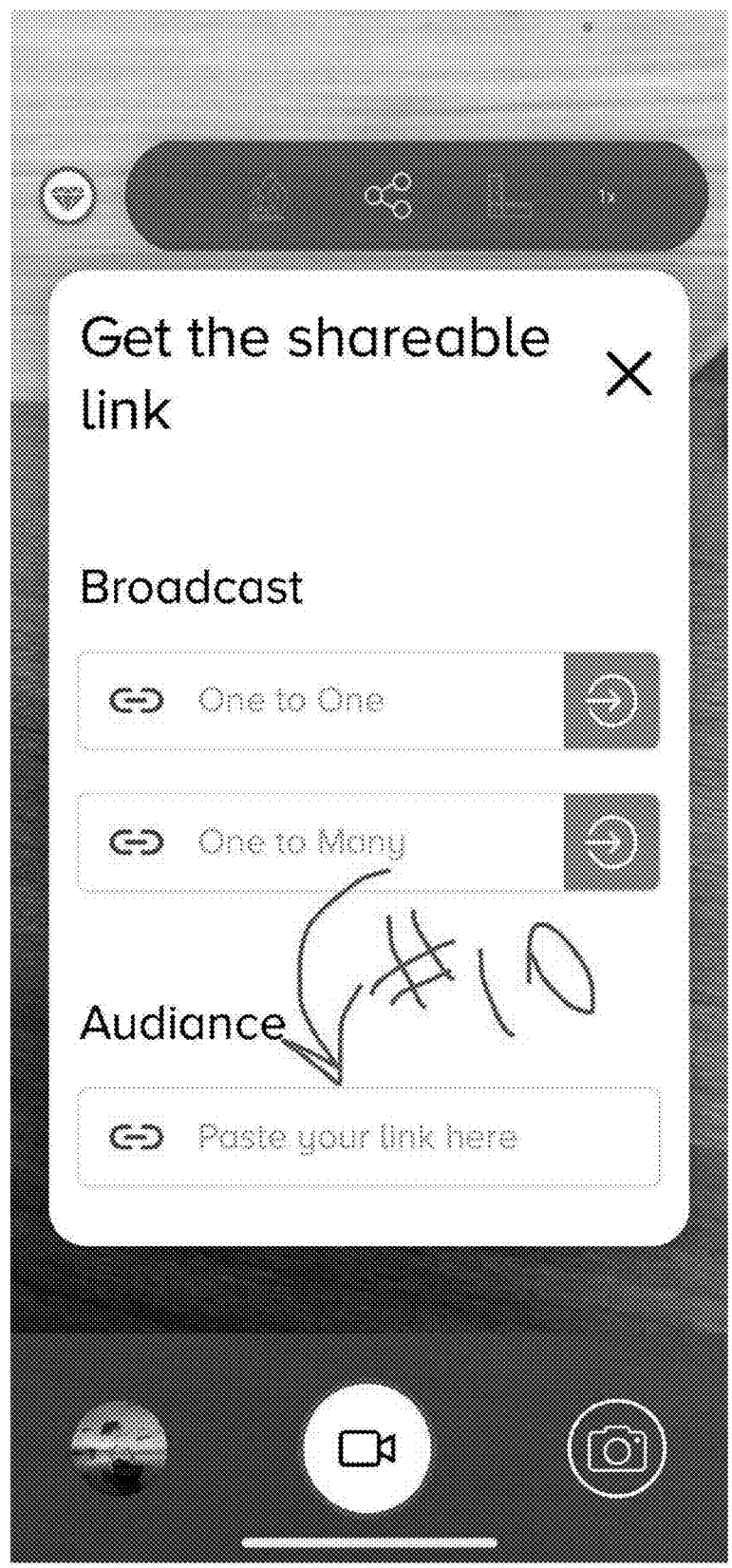

FIGS. 10-19 provide graphical user interfaces of the application during use. FIG. 10 shows the user interface after the application is initially opened—this will be the first view of the application. Subsequent figures will walkthrough the use of the application. FIG. 11 shows that after selecting the small microscope icon at the left-most side of the top menu bar, the set lens power box will come into view, which allows the user to set the objective power, ocular power, and calibration factor. FIG. 12 shows that by sliding over the toggle buttons the user can set the lens powers on the microscope. The top objective power is the magnification of the microscope objectives, which can be from 1 to 100. Ocular power sets the power of the oculars (eyepieces), also from 1 to 100. FIG. 13 shows the calibration factor setting highlighted, which is the ability to perfectly correct the accuracy to each user's individual microscope/connector/phone combination. The user can use the calibration factor "as is" and it will be really close or they can calibrate it for themselves. FIG. 14 shows after finishing the lens power adjustments and/or assigning a specific calibration, the user selects the ruler icon—the second right-most icon on the top menu bar—and the micrometer will display onto the screen. The micrometer will adjust to digital zoom at each increase in power to stay accurate. When taking a photo or video, the micrometer will be visible in the captured image when displayed on the screen. FIG. 15 shows that when starting a broadcast, the user selects the icon with three connected loops located at the top menu bar between the microscope icon and the ruler icon. FIG. 16 shows a drop-down box becoming visible after the broadcast icon is selected, which allows the user to choose between the one-to-one or the one-to-many broadcast functions. One-to-one broadcast can be a consultation-like function where people can collaborate and talk or text back and forth while looking at the broadcaster's screen. In one-to-many, a teaching platform is provided where an educator can teach more students through a microscope than previously capable. After choosing the function needed, the user presses the arrow icon to the right of their selection. FIG. 17 shows what is displayed when the user starts broadcast, including display of the shareable link. An indicator below the drop-down box indicates the broadcast is live and a timer is displayed indicating the length of the broadcast. A Stop Broadcast button is displayed below the live indicator and allows the user to terminate the broadcast. FIG. 18 shows the user selecting the page icon to the right of the link to copy the link. A message below confirms that the link has been copied. The user can send this link via text or email to those who will accept the broadcast. FIG. 19 shows the field where audience users can paste the link to accept and watch the broadcast and then begin viewing.

Figure 20:
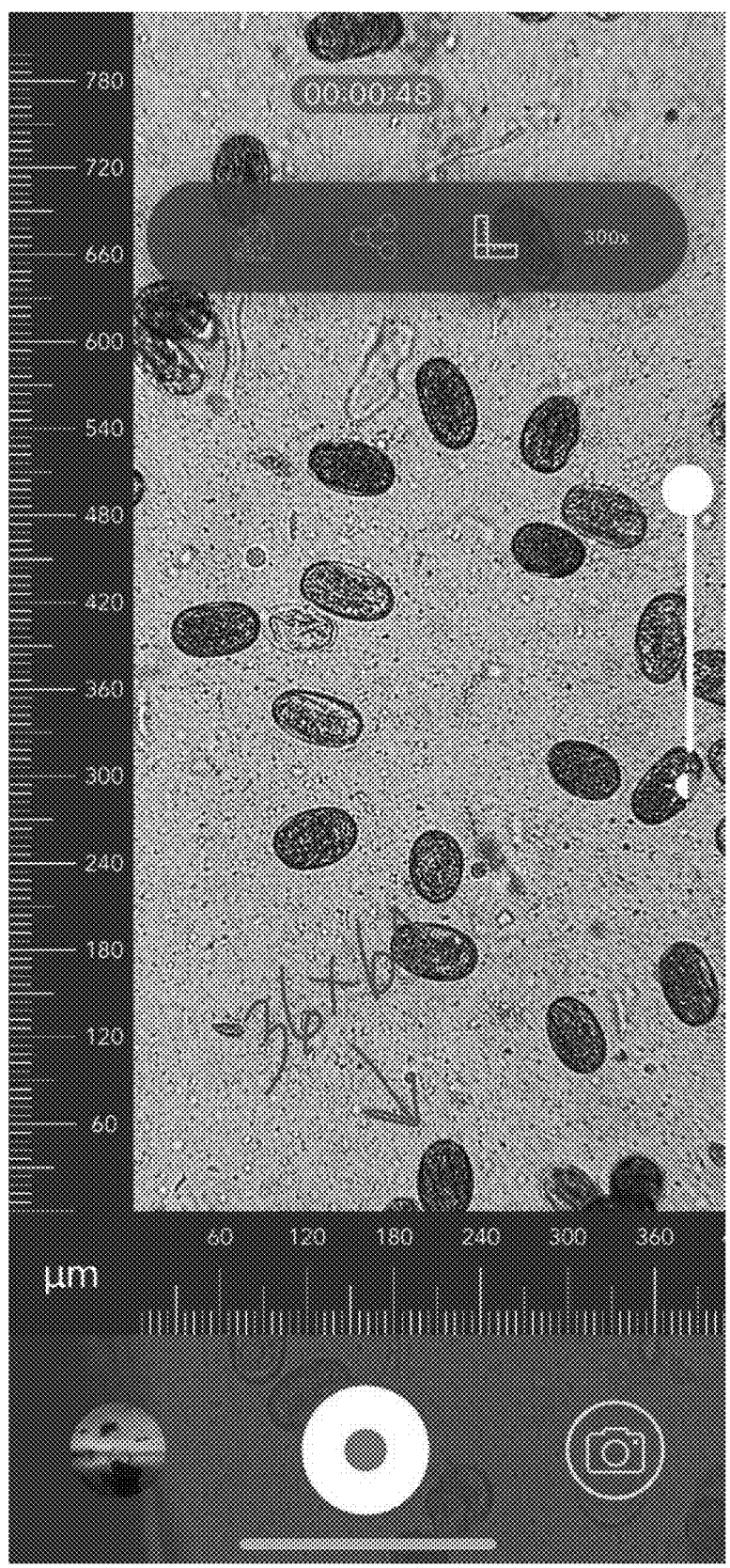
Figure 21:
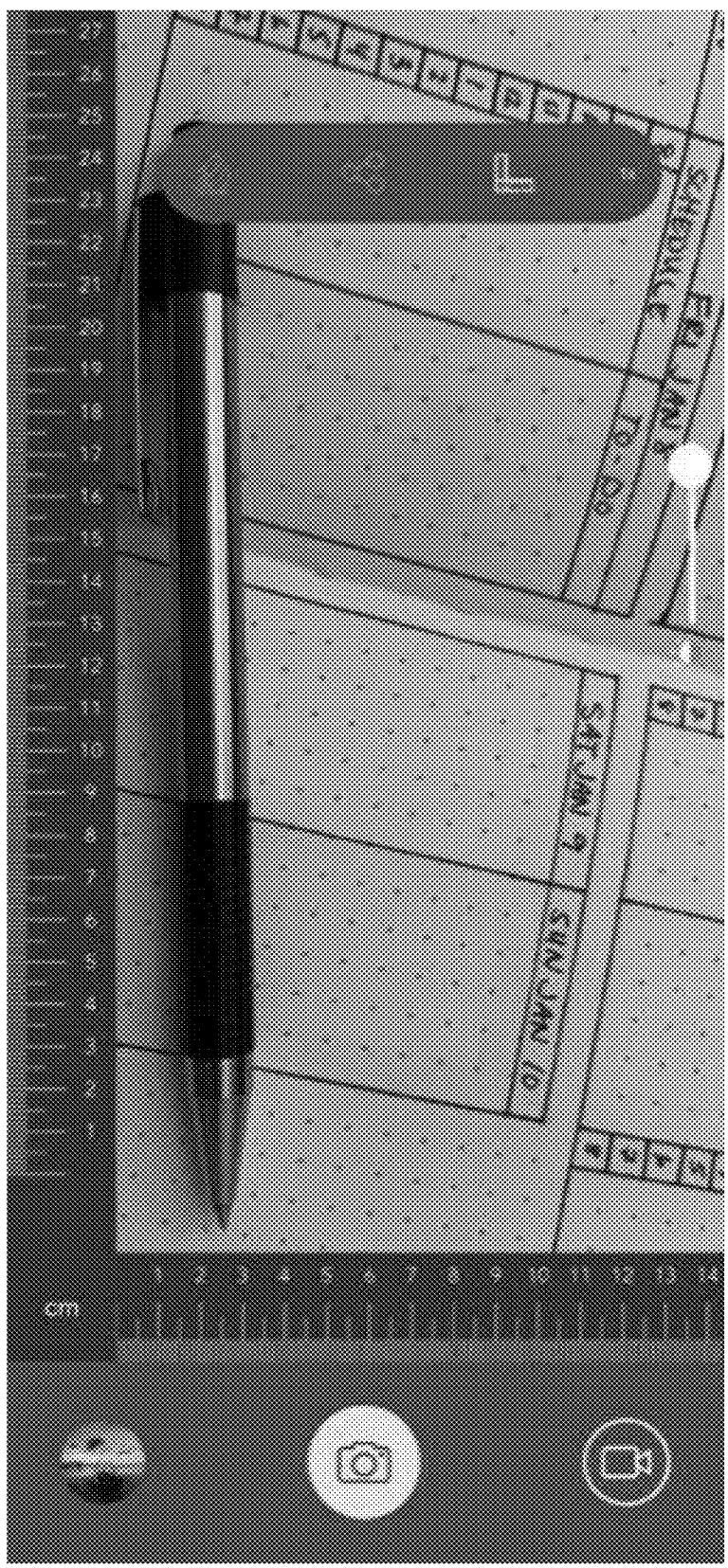

FIGS. 20 and 21 show additional examples of the application during use. In the example shown in FIG. 20, an adapter and connector allow for a personal electronic device such as a cell phone to be attached to a microscope. Using the application installed and activated on the personal electronic device (for example, a phone) Ancylostoma (Hook Worm) eggs are viewed and measured using the application. It is known that Hook Worm eggs average 60-75 micrometers by 35-40 micrometers in size. Looking at the egg that is highlighted along the bottom of the scale the viewer can see the egg is about 36×60 micrometers in size. The application is capable of measuring very small items through a microscope of varying size and magnification. For example, the application can be calibrated to measure items of interest that are around 1 mm or less in size. Further, the application can be calibrated to a user's specific microscope and phone to an accuracy of within 1 micron, which is 1/1000th of a millimeter. In the example presented in FIG. 20, the application is set up to allow for magnification up to 15,000 power. In addition, the application is capable of measuring items of larger lengths. As seen in FIG. 21, a standard pen is measured using the application, and the scale of the measurement tool is centimeters.

Figure 22:
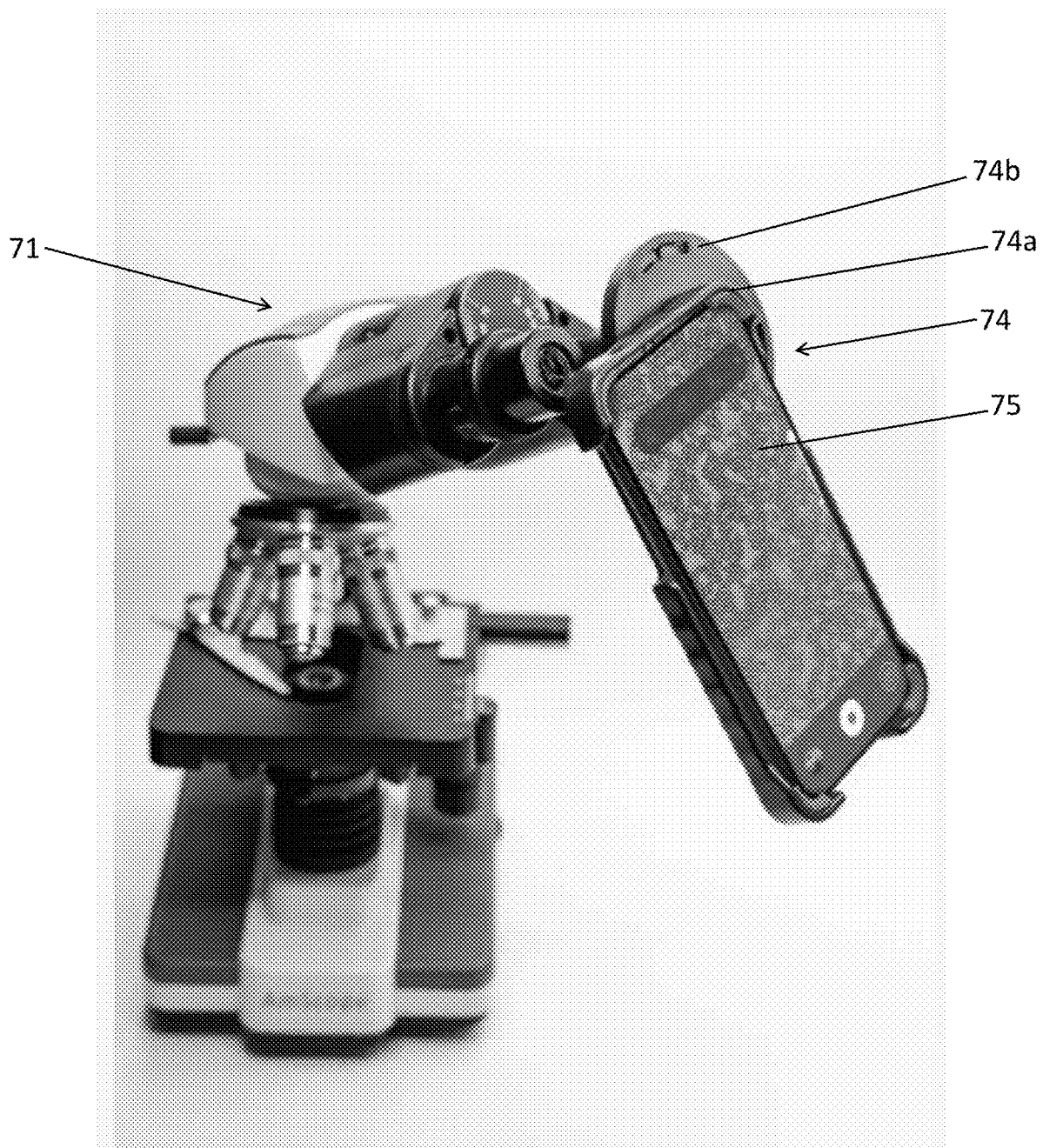
FIGS. 22, 23 and 25-38 are images
Figure 23:
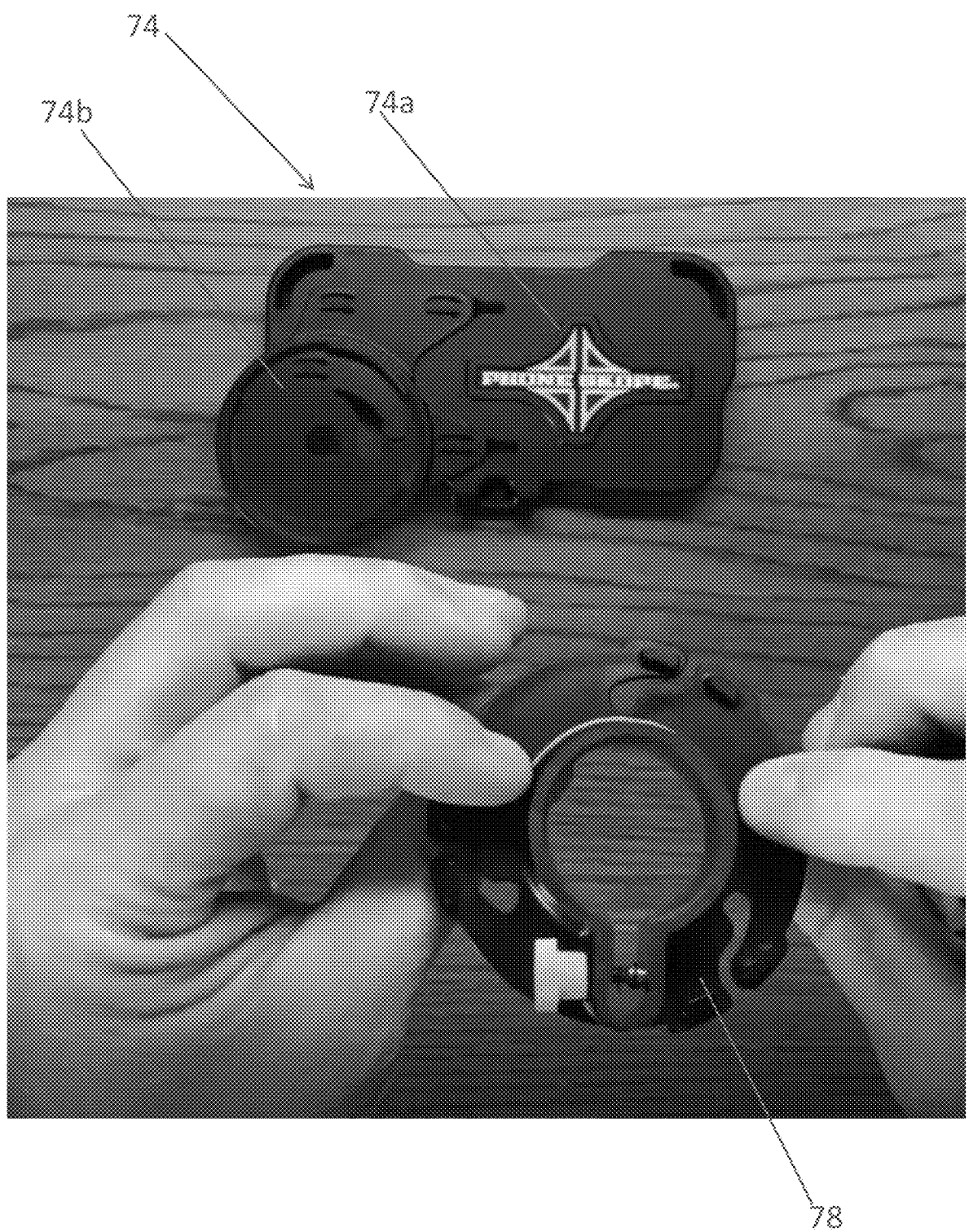
Figure 24:
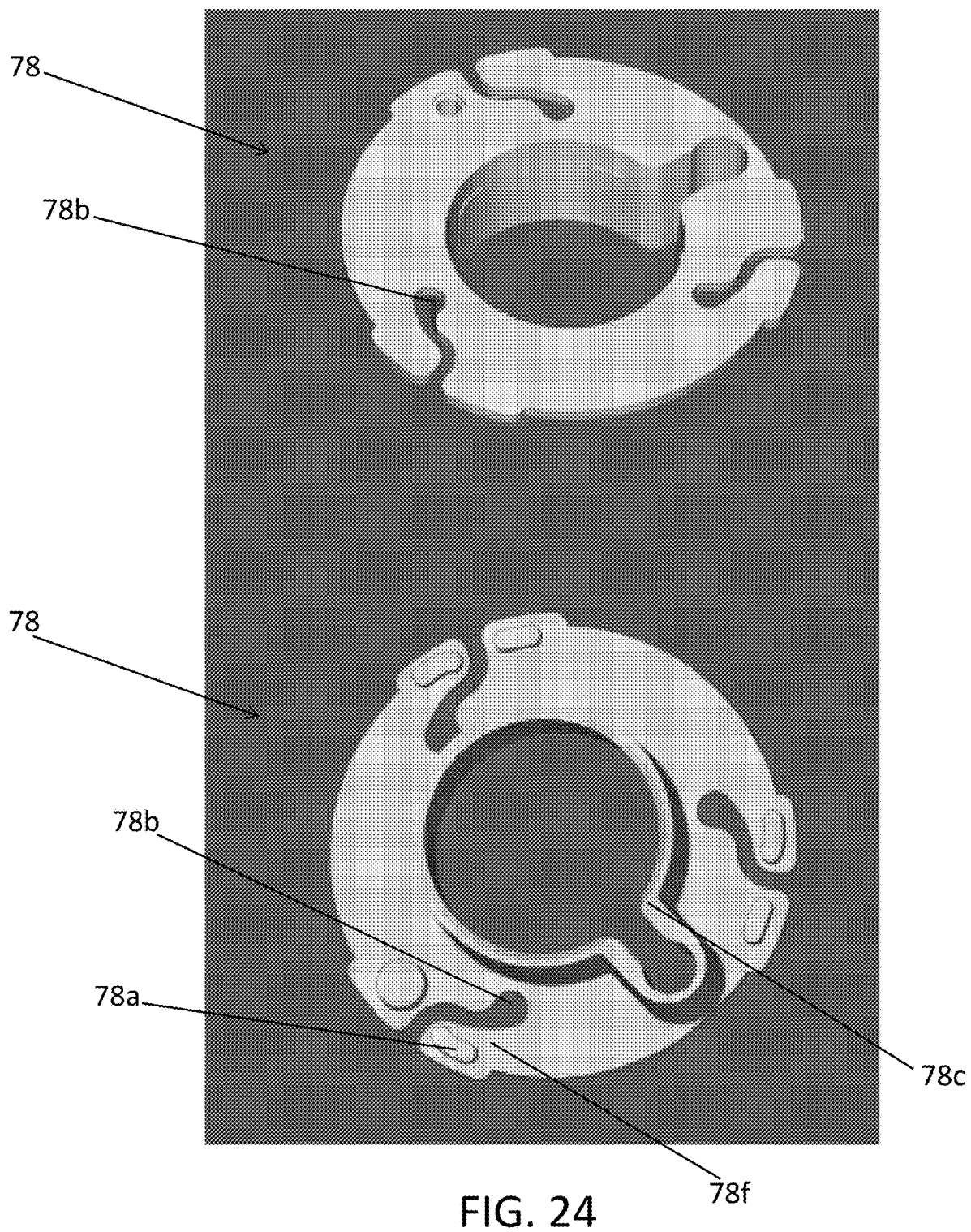
FIG. 24 is a diagram that show various hardware for mounting and connecting a smartphone to a microscope so that images from the microscope can be captured with the camera of the smartphone according to various implementations.
Figure 25:
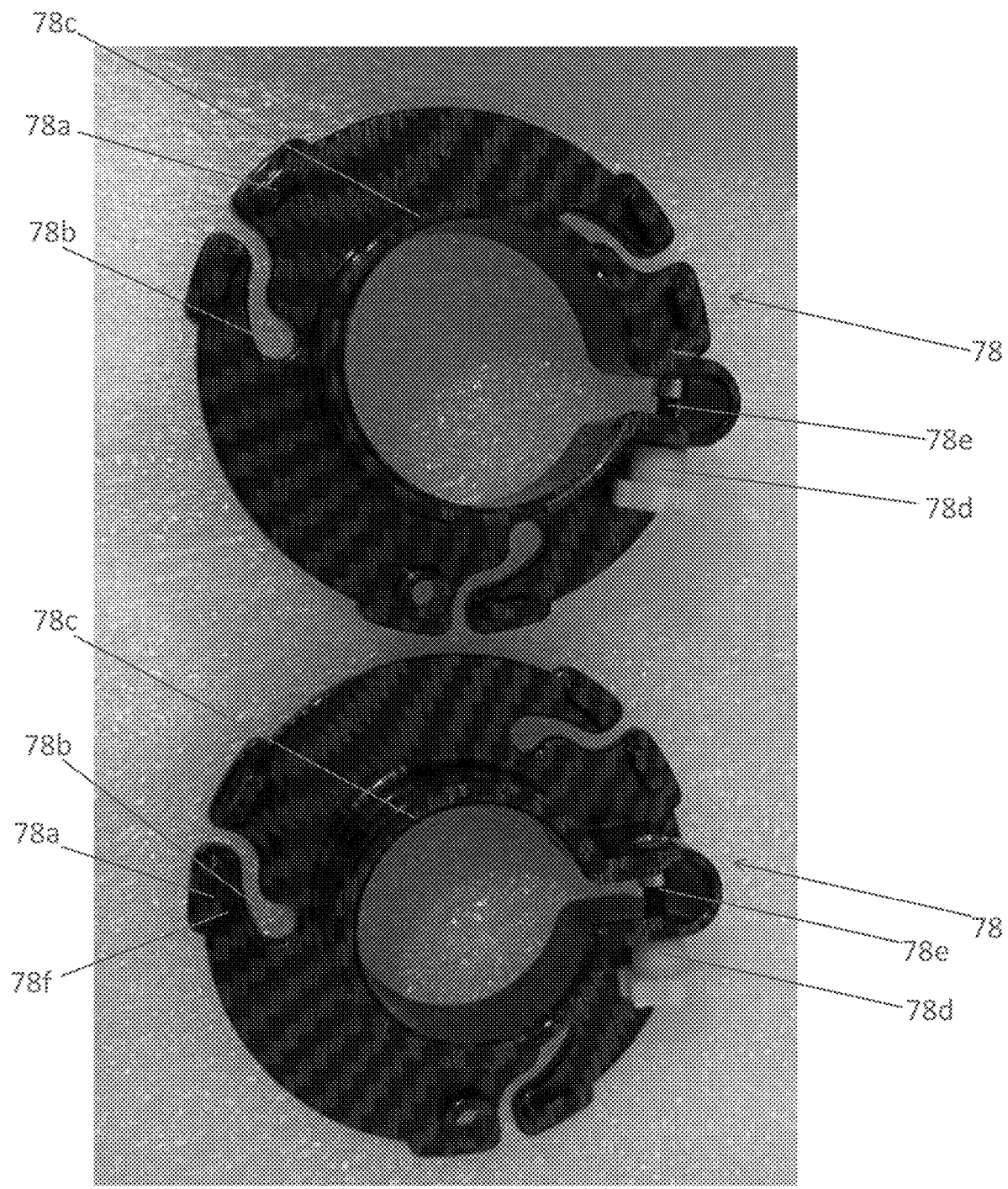

FIGS. 22-38 provide images which show the application installed on a phone, where the phone is mounted to a case/holder/connector that allows the combination to be mounted to a microscope via an adapter (eyepiece holder). FIG. 22 shows an application used on a phone 75 mounted to a microscope 71. The phone is mountable to a microscope through a connector 74 which includes a cell phone holder 74*a* and adapter holder 74*b*. The adapter holder 74*b* provides a connection to the microscope while allowing a view through the microscope 71 through a smartphone 75 camera lens. The parts associated with mounting the phone to the microscope are shown in detail in subsequent figures. FIG. 23 shows a top view image of the connector 74 with its primary hardware, the cell phone holder 74*a* and adapter holder 74*b*. The adapter 78 configured to fit in adapter holder 74*b* is shown being held. FIGS. 24 and 25 call out individual parts of the adapter 78 in detail, including raised portions 78*a* located at the periphery of the adapter, curved grooves 78*b* extending toward the interior of the adapter, each of which provide for a flexible or deformable portion 78*f* located adjacent to the grooves, and an adapter bore wall 78*c*. The raised portions 78*a* and deformable portions 78*f* help to both align and removably secure the adapter 78 in place when fit in adapter holder 74*b*. The adapter bore wall 78*c* is the structure that accommodates the microscope eyepiece which is inserted into the ocular of the microscope.

Figure 26:
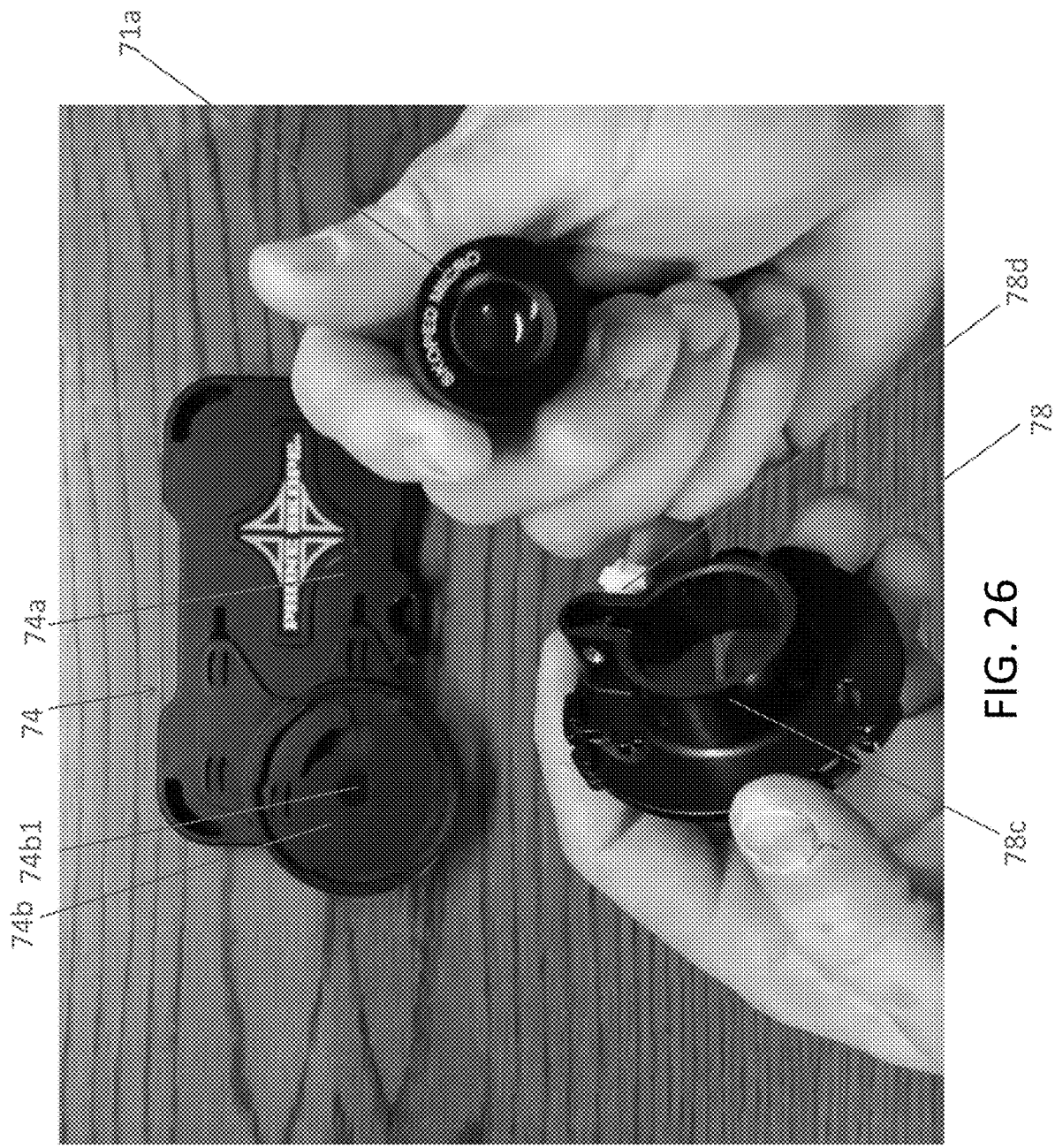
Figure 27:
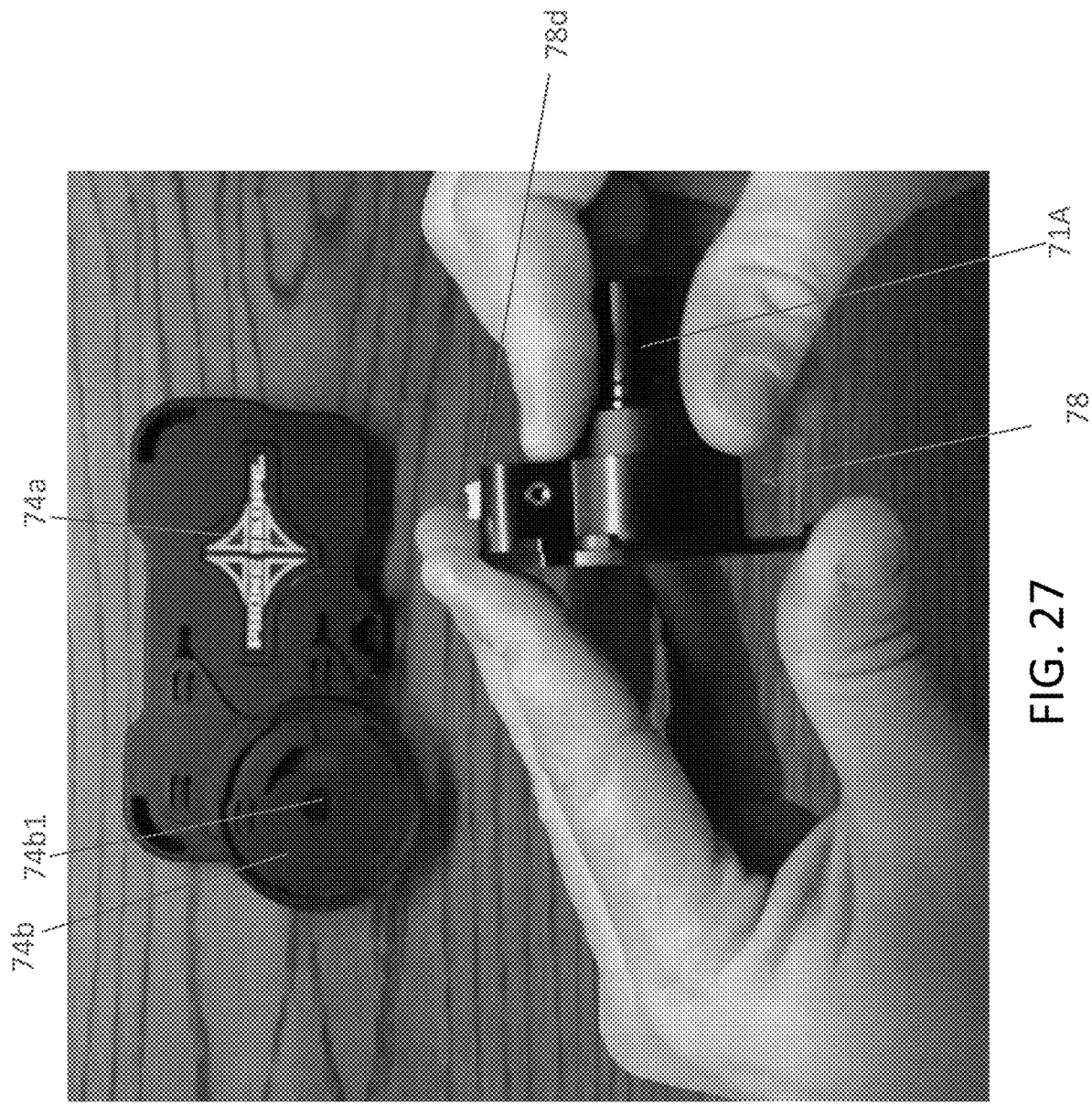
Figure 28:
Figure 29:
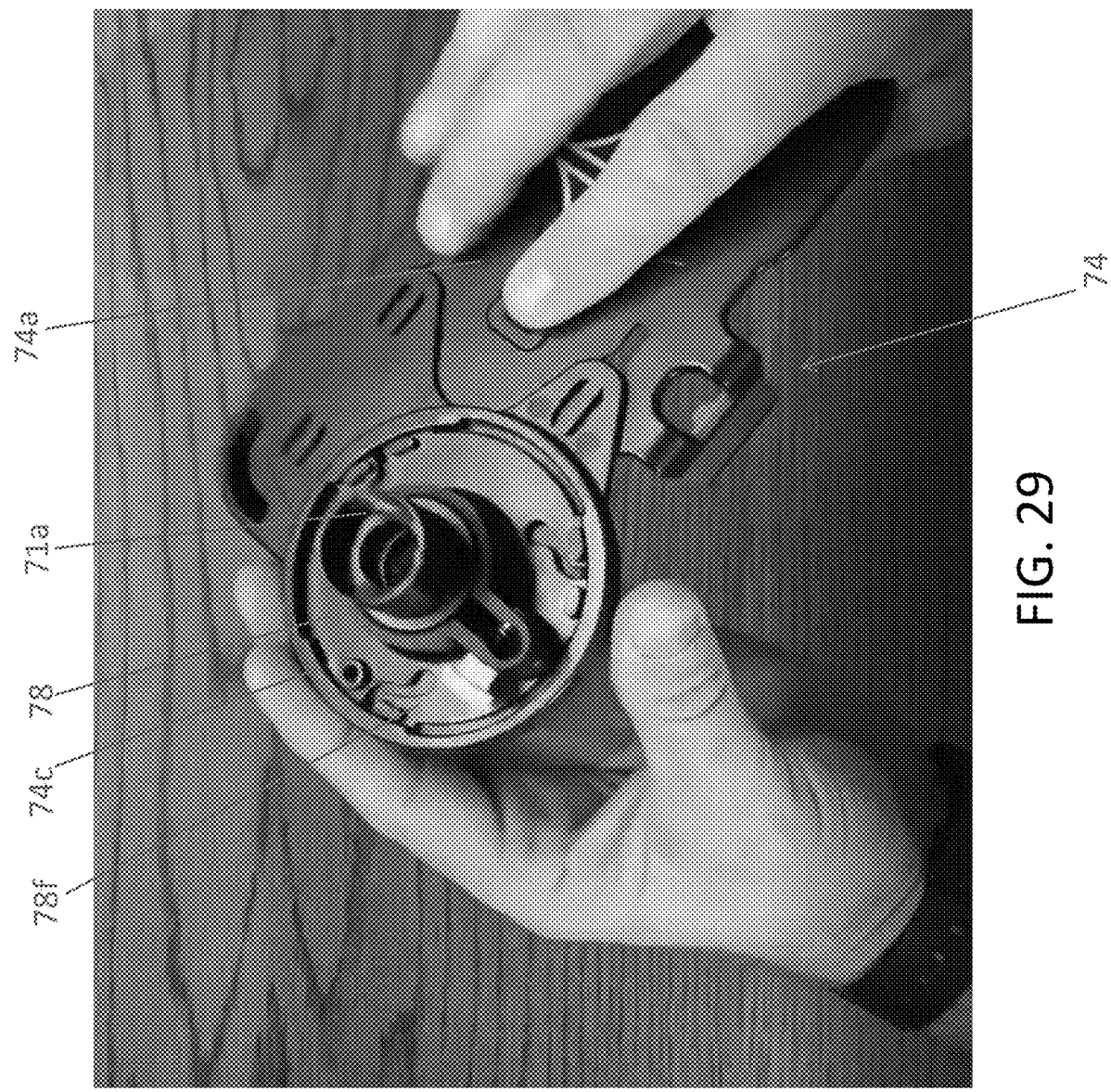
Figure 30:
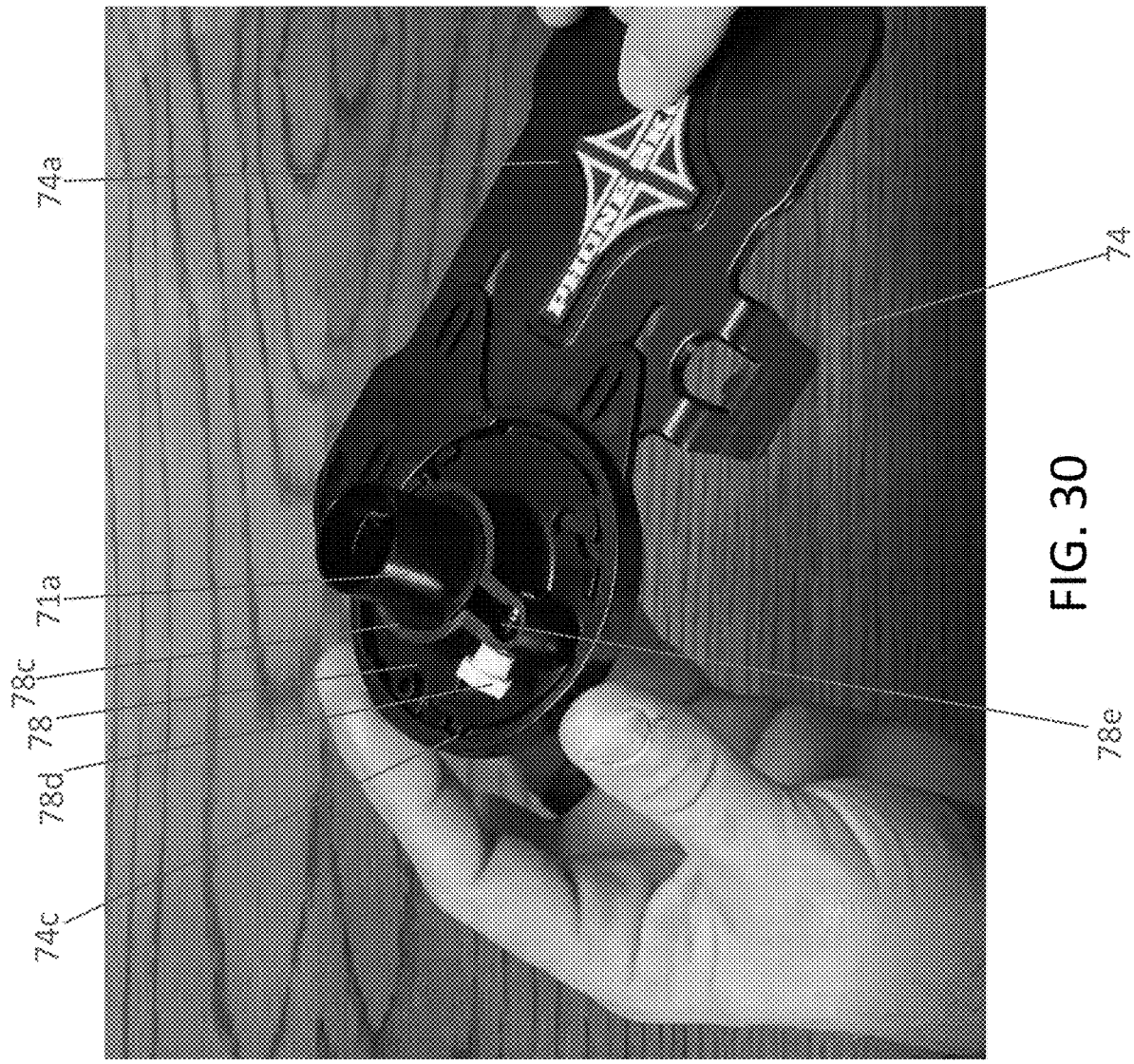
Figure 31:
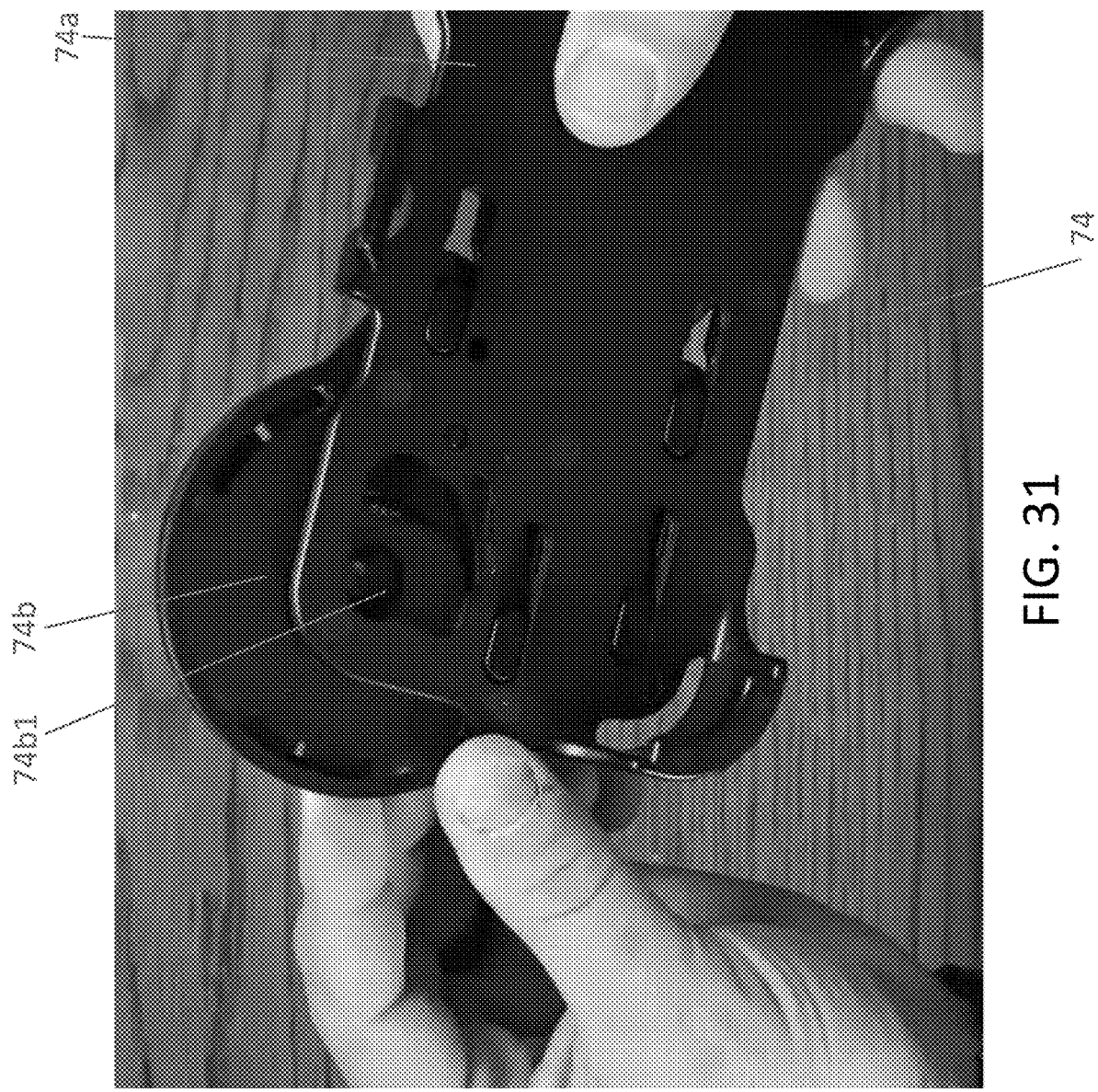
Figure 32:
Figure 33:
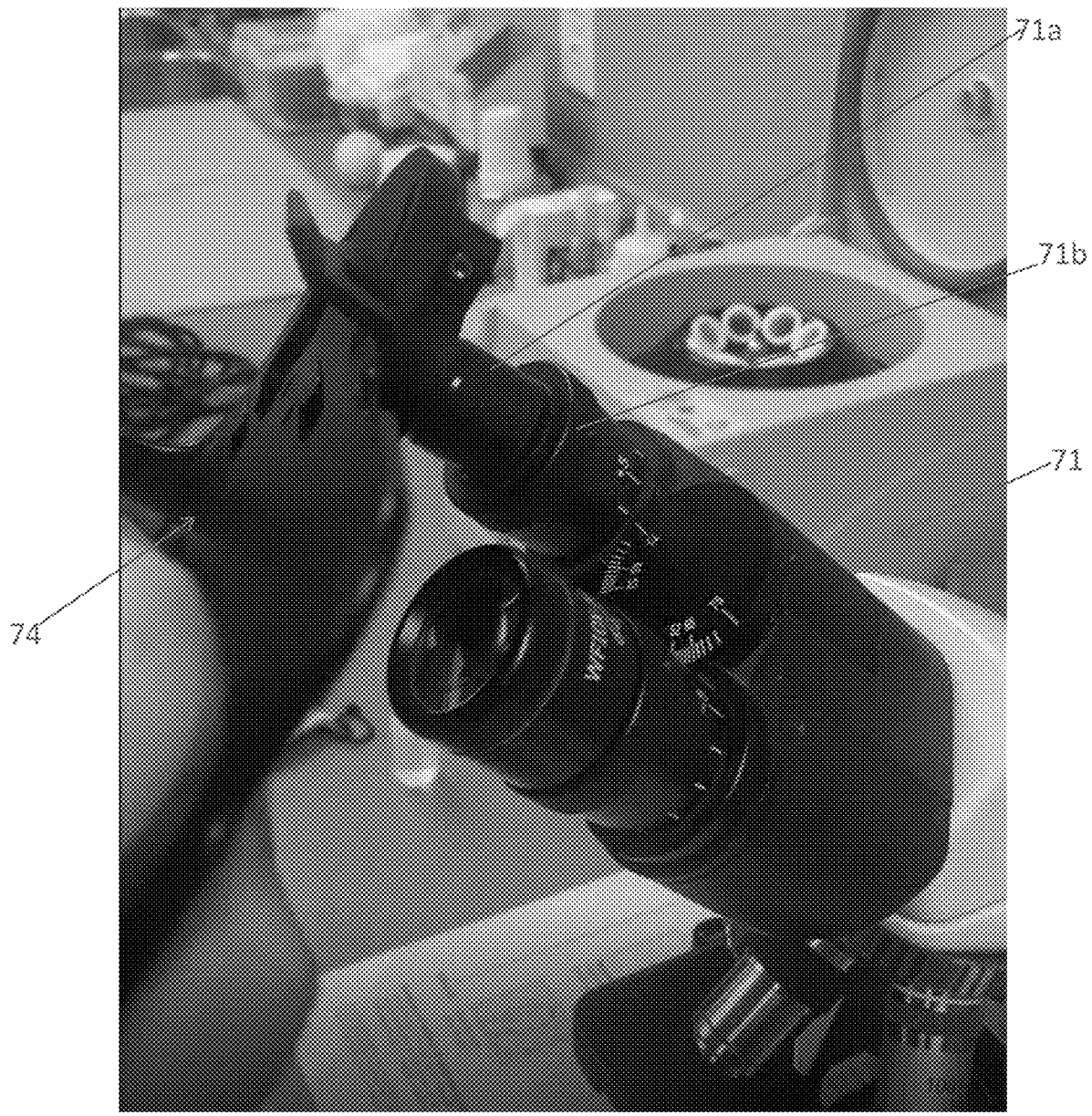
Figure 34:
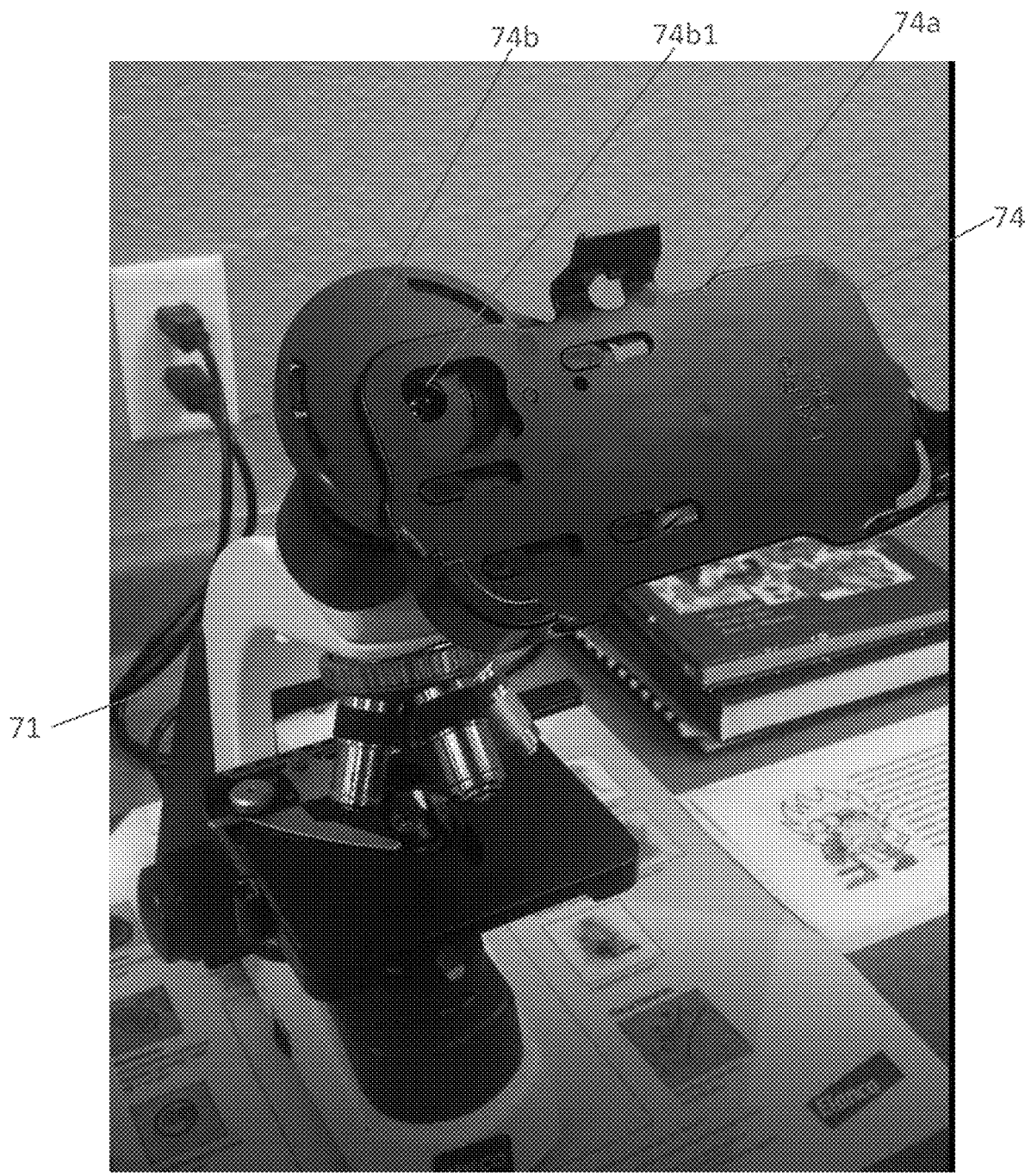
Figure 35:
Figure 36:
Figure 37:
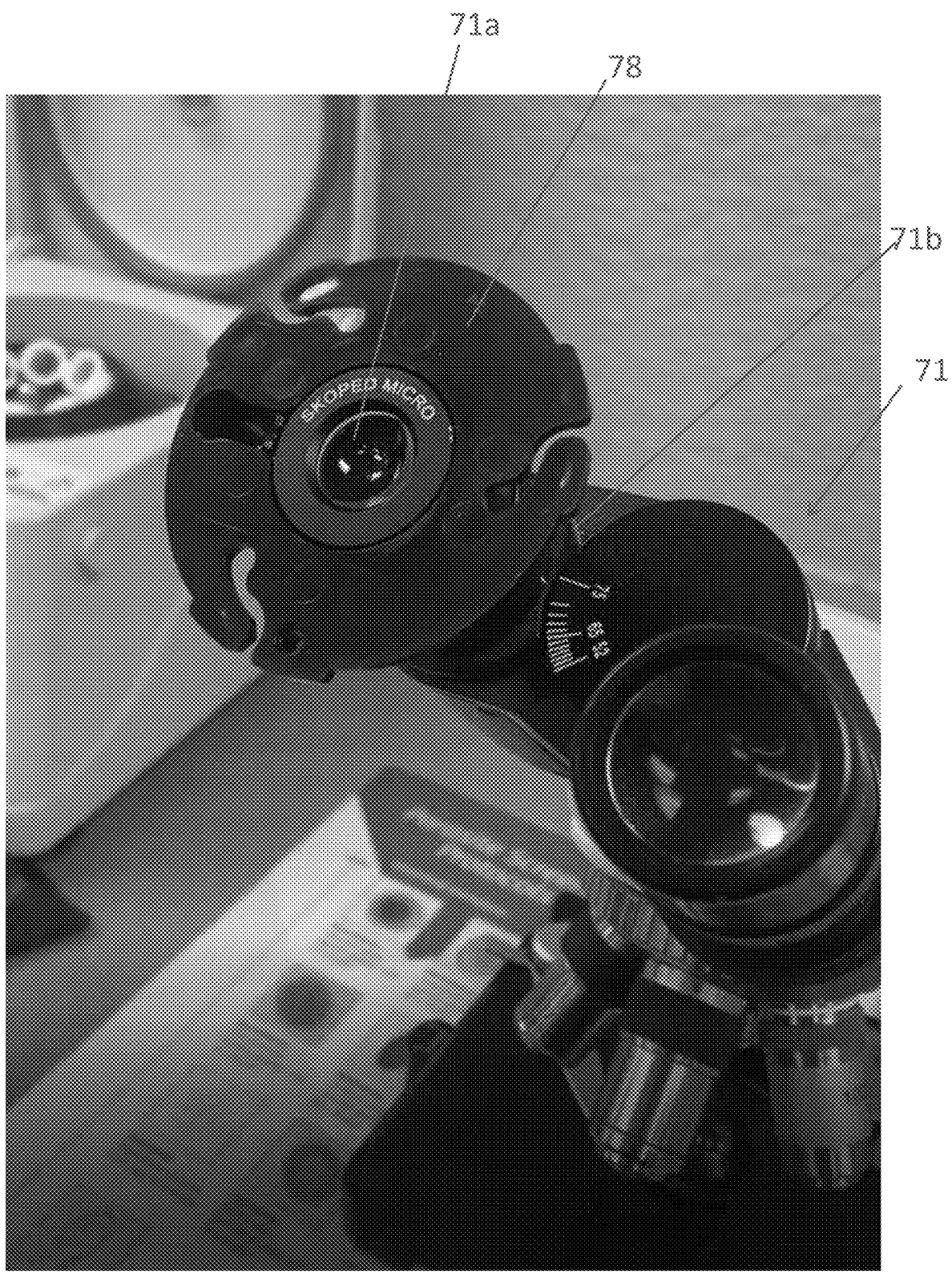
Figure 38:
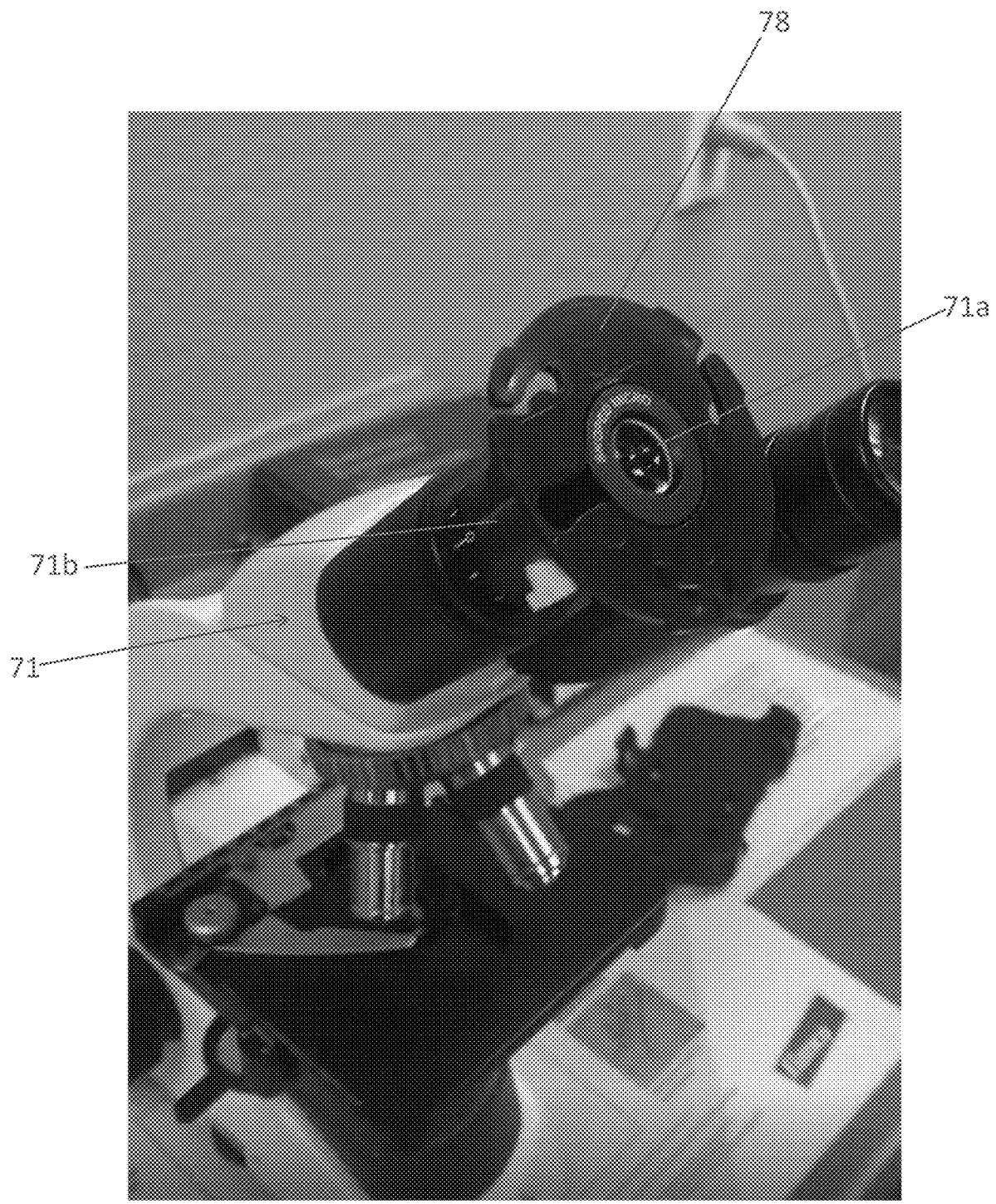

FIG. 25 additionally shows adapter screw 78*e* and adapter adjustment knob or screw head 78*d* which can adjust the length of the screw in the bore wall 78*c* and ultimately the size of the bore diameter. It can be seen that the topmost adapter 78 has a larger bore diameter than that of the adapter below it, and is thus able to accommodate a larger diameter eyepiece. FIGS. 26-28 show these components, with eyepiece 71*a* being inserted into the adapter bore 78*c*. The eyepiece is held in the adapter bore 78*c* by friction fit, which is adjusted by turning the adapter adjustment knob 78*d*. The lens hole 74*b*1 in the adapter holder 74*b* of the connector 74 aligns with the eyepiece 71*a* to allow images to be taken with the cell phone's camera and recorded or broadcast by the application. FIGS. 29-31 show the adapter inserted into the adapter holder of the connector 74. The adapter 78 fits in the adapter holder portion 74*b* by snapping into a rim 74*c* of the adapter holder through contraction then expansion of flexible or deformable portions 78*f*. The lens hole 74*b*1 in the adapter holder 74*b* lines up with both the camera lens of the cell phone and the microscope eyepiece 71*a*. This allows the user to capture the microscope view though the phone's camera lens and allows for the features and functionalities described above. FIGS. 32-38 show connector (FIGS. 32-34) or adapter 78 (FIGS. 35-38) mounted to a microscope 71 by sliding a portion of the microscope eyepiece 71*a* into the microscope ocular 71*b*. As shown, the microscope eyepiece 71*a* held by adapter 78 fits in corresponding ocular 71*b* of microscope 71. When cell phone is mounted within cell phone holder 74*a*, the application can take, broadcast, and measure images through the microscope 71 captured by the cell phone's camera.

Figure 39:
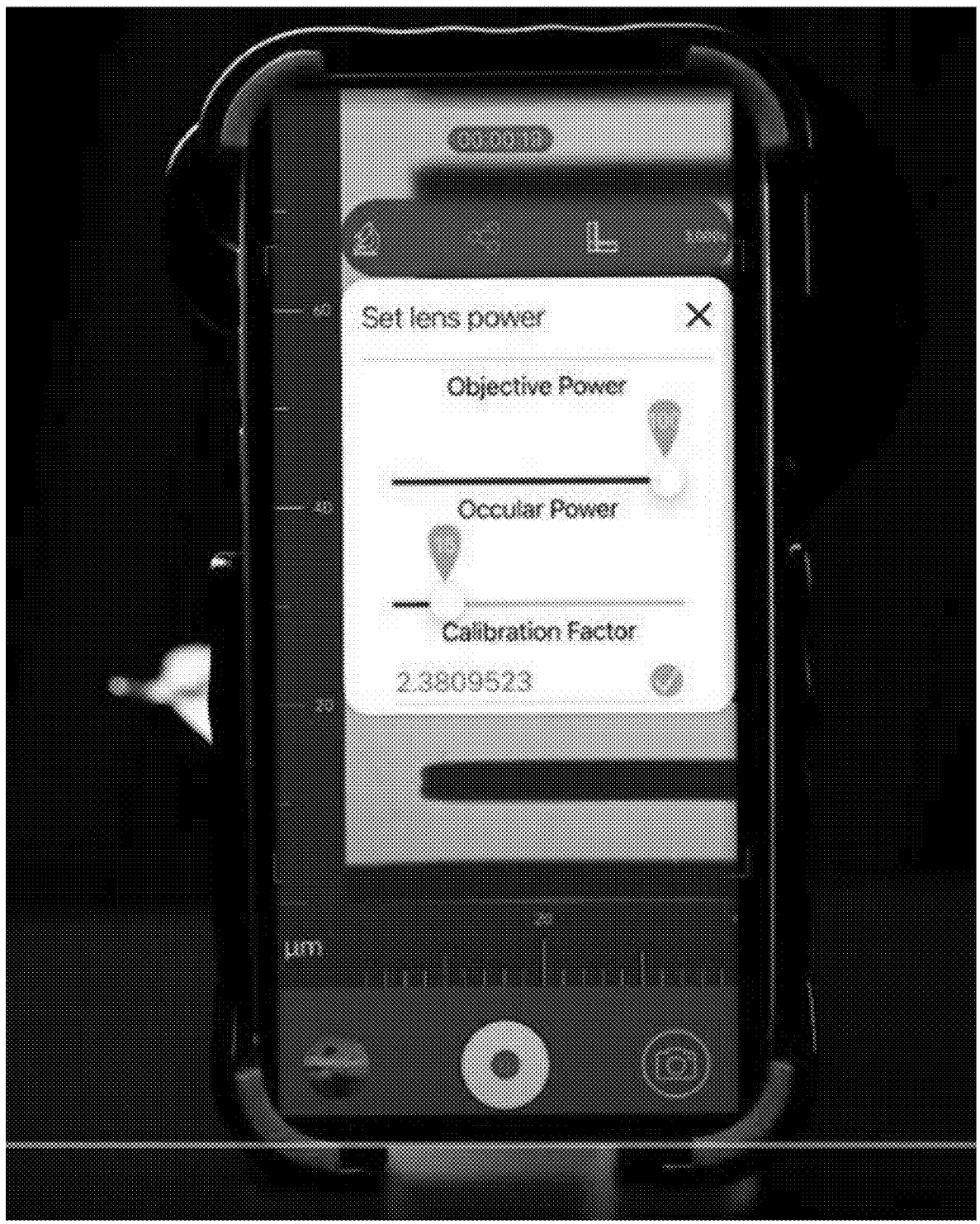
FIGS. 39-44 are images of graphical user interfaces of an application for capturing microscopy images which demonstrate a method of calibrating the measurement tool of the application according to various implementations.
Figure 40:
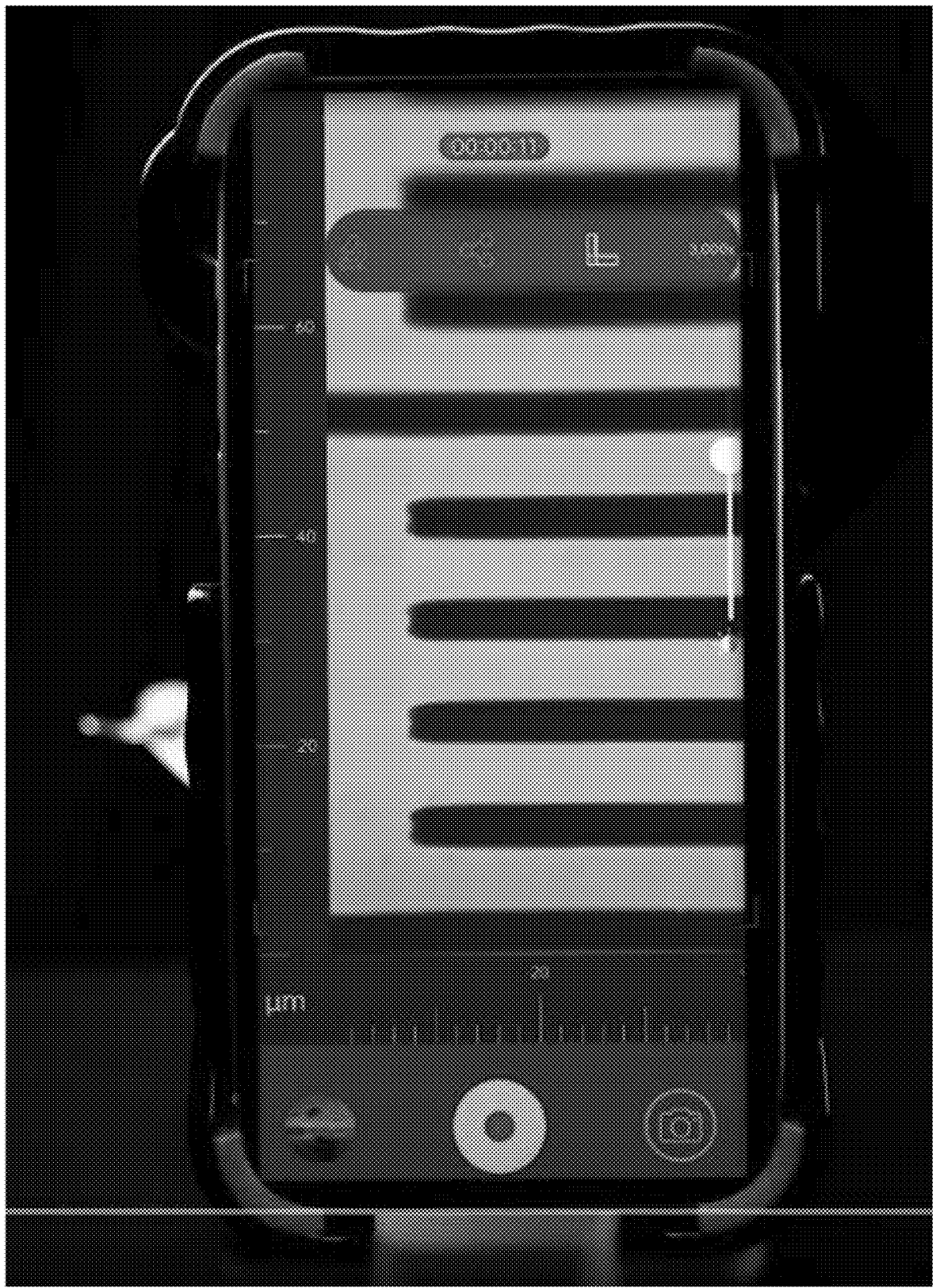
Figure 41:
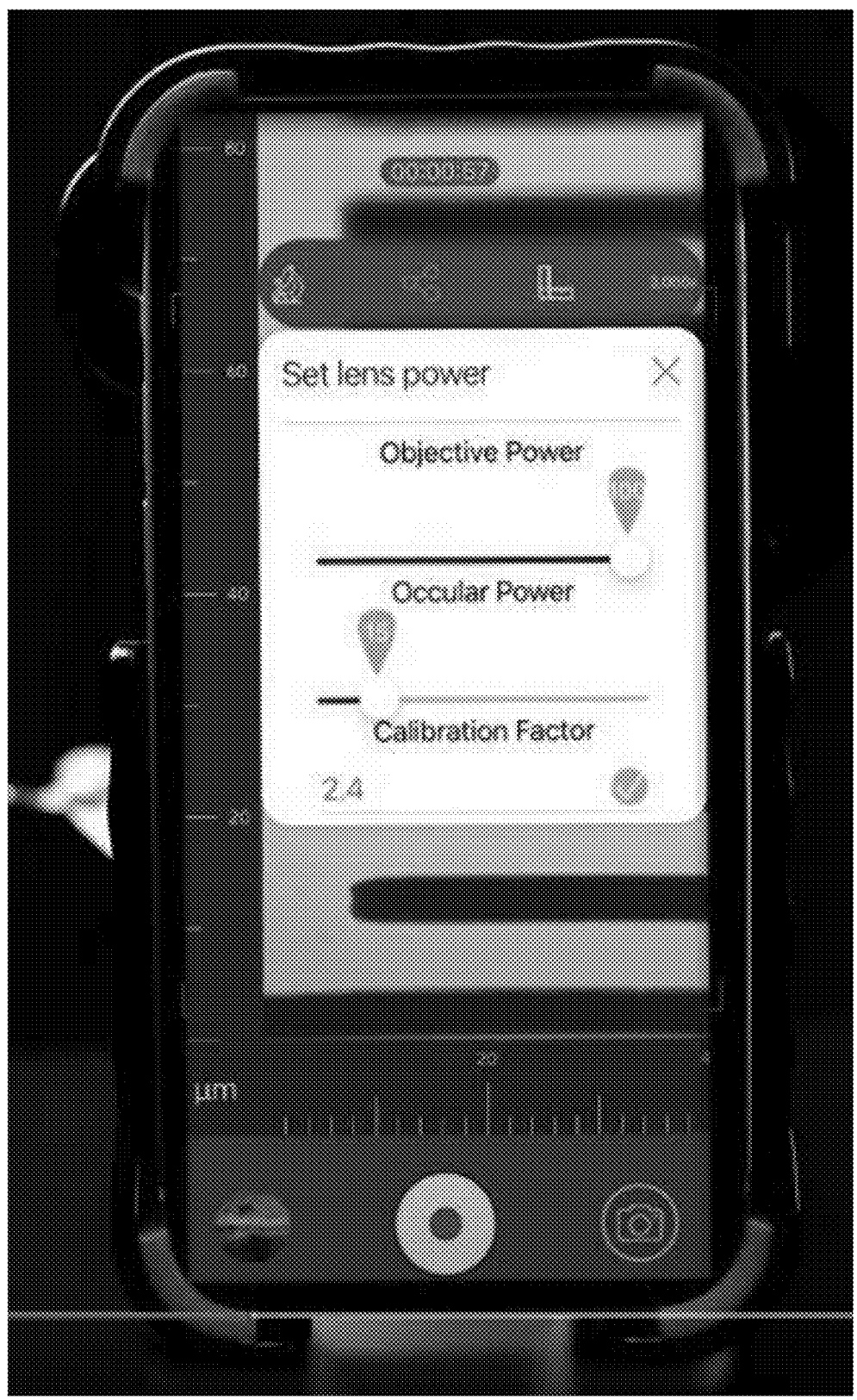
Figure 42:
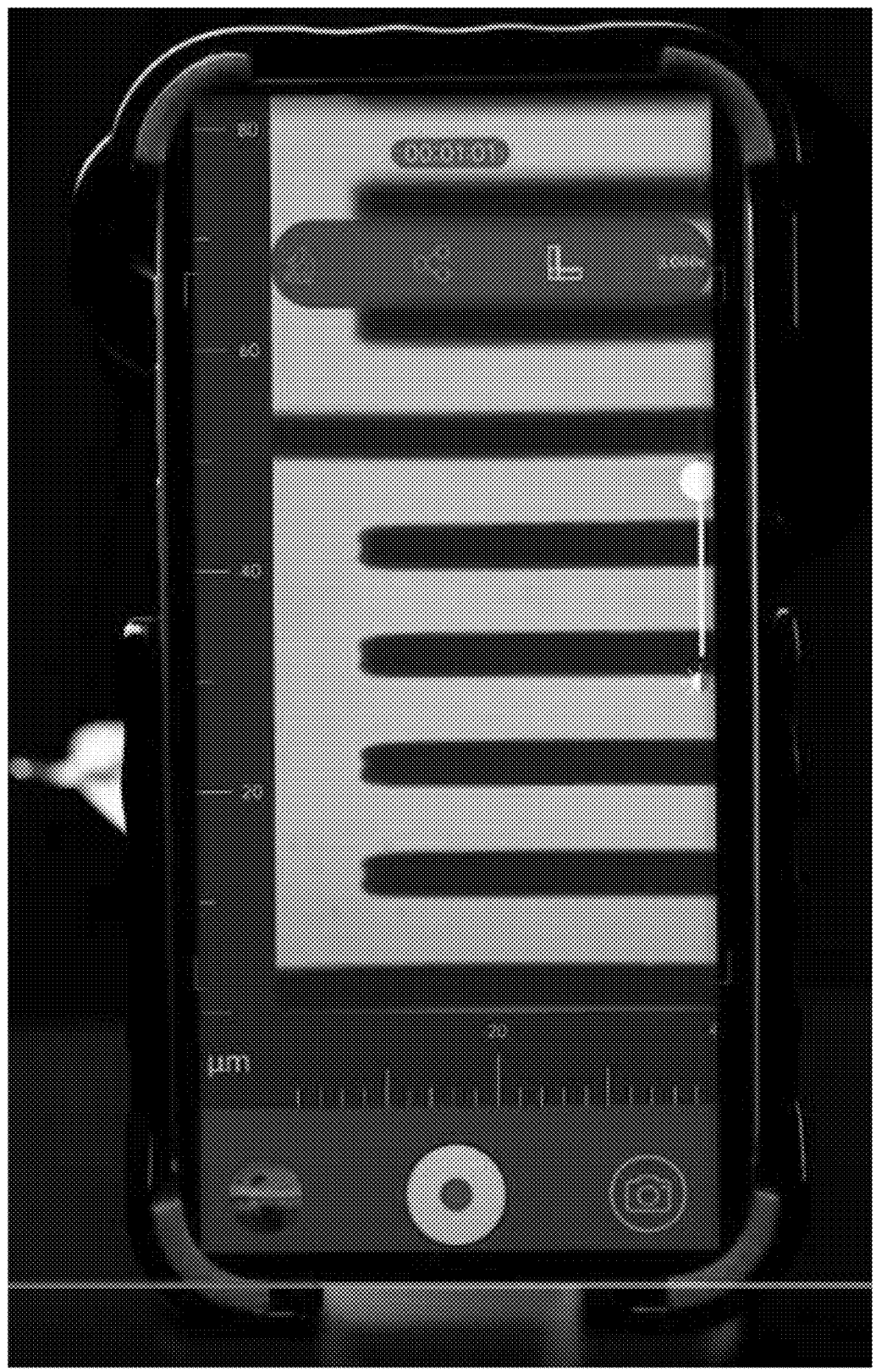
Figure 43:
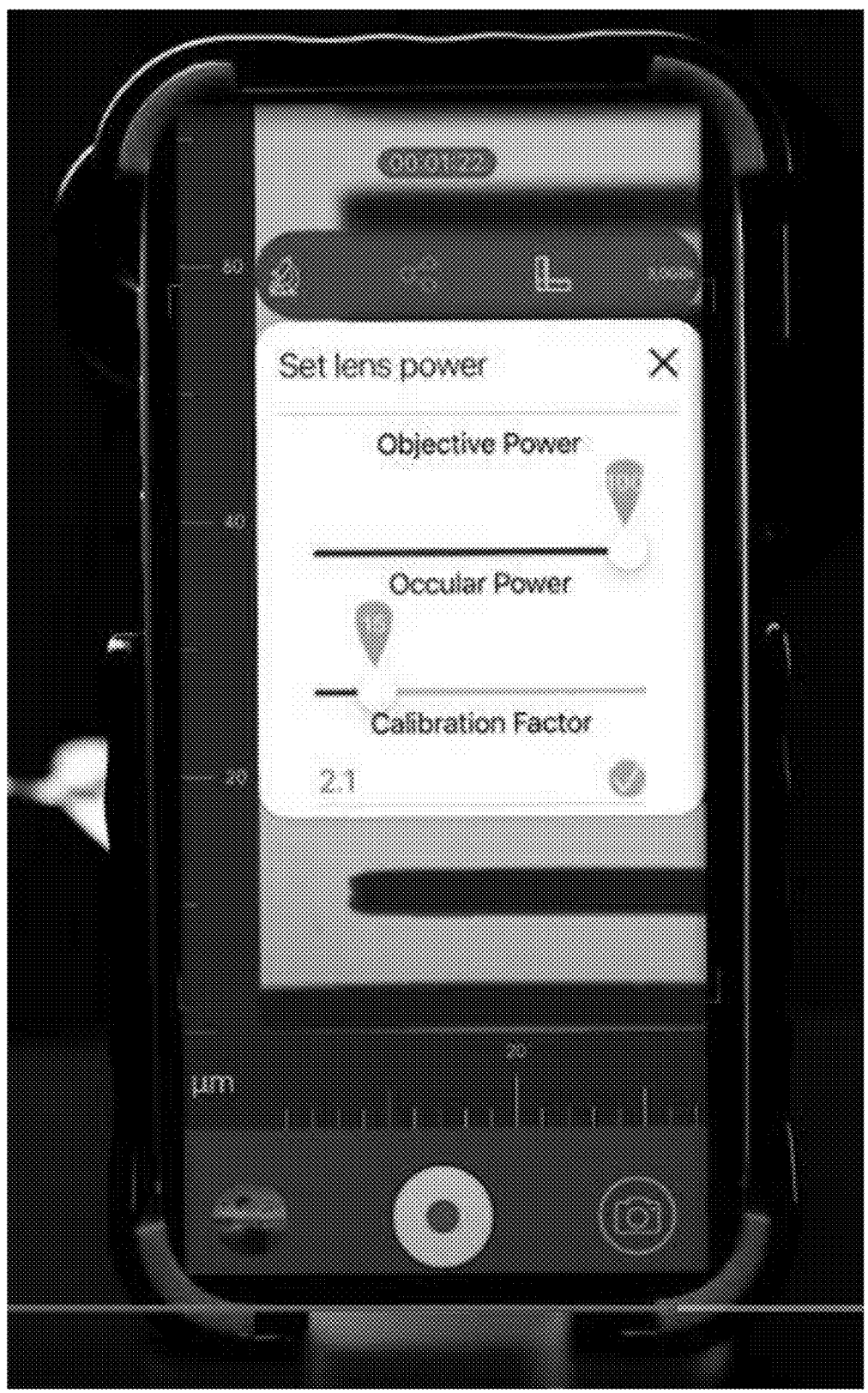
Figure 44:
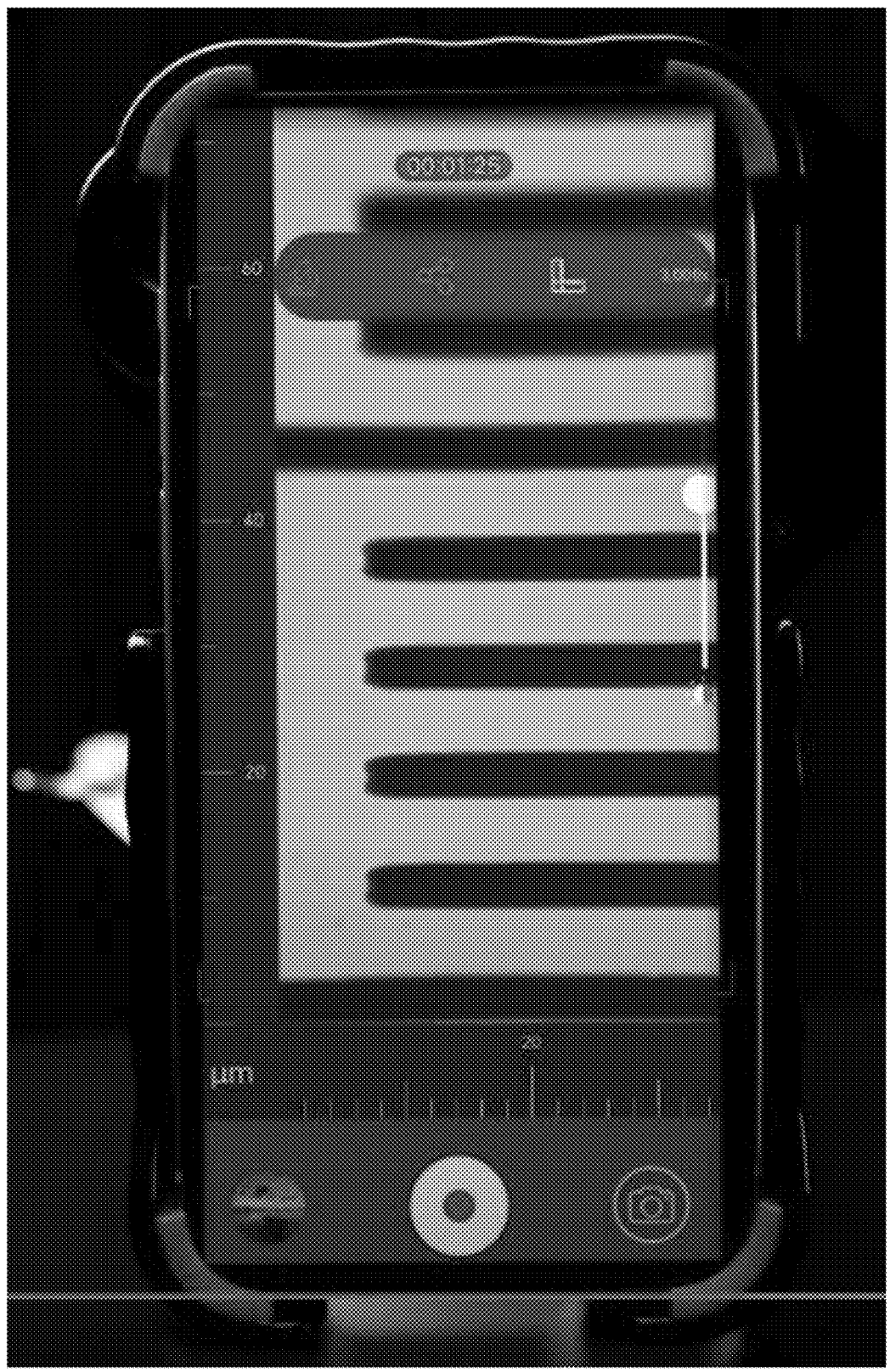

FIGS. 39-44 show a method of calibrating the application, which occurs before the measurement function is used. The way to calibrate the measurement is by using a known measurement device such as a ruler to align the graduations on the ruler to the graduations in the application so that the two are spaced apart equally. The mechanism of calibration is achieved by adjusting the calibration factor to make the graduations on the tangible ruler or their spacing align with the graduations of the application measurement ruler. The user increases the calibration factor to shrink the scale or decreases the factor to grow the scale. A calibration example is shown in FIG. 39. In this example, a micrometer-based slide is the known measurement device used to calibrate the application when using a given microscope. In this example the calibration factor is 2.3809523 which is the correct calibration factor for this particular microscope. This proper calibration is shown in FIG. 40. Proper calibration is achieved when the spaces between the graduations of the known measurement scale of the micrometer slide are consistent with the scale of the measurement tool displayed on the y-axis by the application. FIG. 41 shows an example where the calibration factor is 2.4 which is the incorrect calibration factor for this particular microscope. The user is able to see that the calibration factor is off in FIG. 42. The calibration is slightly off in this example as the graduations of the known measurement scale of the micrometer slide do not match or align with the scale displayed by the measuring tool's y-axis in the application. FIG. 43 shows an example where the calibration factor is 2.1 which is the incorrect calibration factor for this particular microscope. The user is able to see that the calibration factor is off in FIG. 44. The graduations of the known measurement scale of the micrometer slide do not match or align with the y-axis scale displayed by the application.

Figure 45:
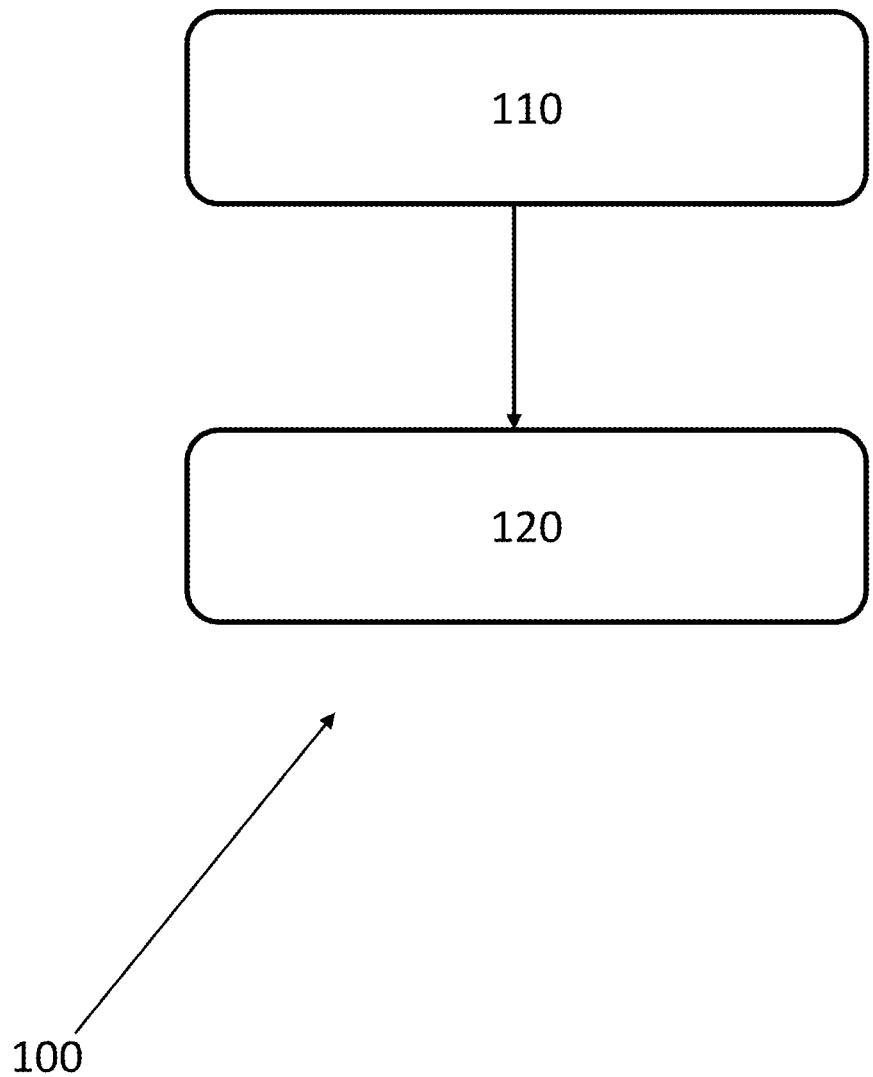
FIG. 45 is a schematic diagram depicting a method according to one implementation.
Figure 46:
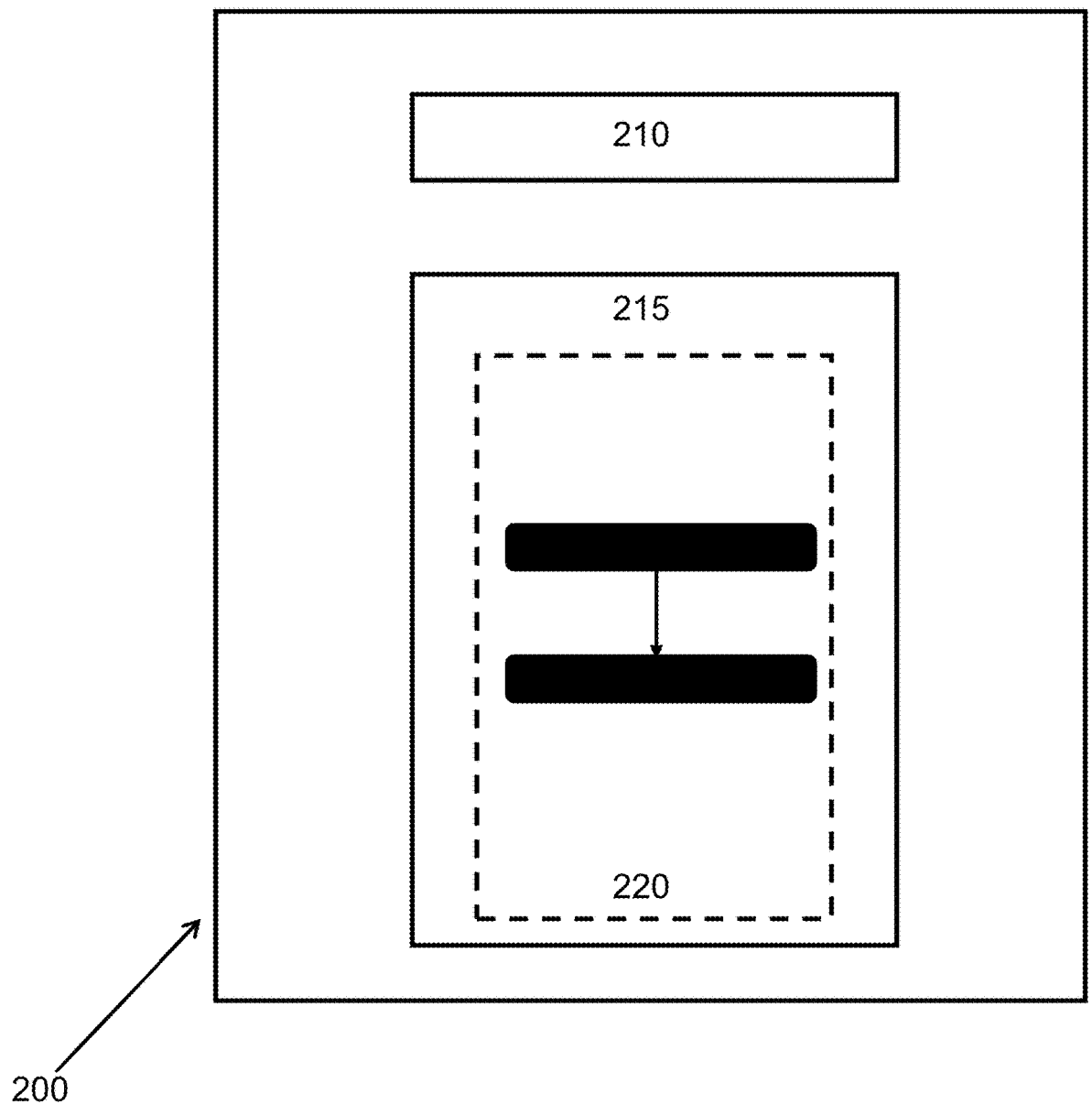
FIG. 46 is a schematic diagram depicting a computer or computer system according to one implementation.

FIG. 45 depicts a method 100 of viewing a live image from a microscope through a camera lens of a first personal electronic device that can be implemented by way of an application and/or dedicated website displaying one or more of the graphical user interfaces(s) depicted in FIGS. 1-21 and FIGS. 39-44. Interaction of a user with the one or more graphical user interface(s) can provide input of information and cause instructions performable by one or more processor (s) to execute one or more step(s) of the method 100. The instructions can be stored on a non-transitory computer readable storage medium or media on a computer or computer system that also has one or more processor(s) designed to execute instructions. In one implementation, the method 100 includes receiving one or more optic powers of a microscope taking the live image entered into a first graphical user interface displayed on a screen of the first personal electronic device 110, and projecting a measurement tool on a second graphical user interface displayed on the screen of the first personal electronic device with units of measurement based on the entered optic powers 120. FIG. 46 depicts a computer or computer system 200 having one or more processor(s) 210 designed to execute instructions, and one or more non-transitory, computer-readable memories 215 storing program instructions 220 for execution by the one or more processor(s) 210, the instructions programmed to cause the one or more processor(s) to perform the method depicted in FIG. 45.

As can be appreciated by those in the computer engineering arts, inputting steps depicted in the figures, such as choosing various functions of the application or entering information such as objective power, ocular power, or calibration factor can be performed through one or more input-output (I/O) interface on a fixed position computer or computers such as a desktop computer or server or on a portable computer/computing device or devices, such as a personal electronic device including a tablet, laptop, PDA, gaming device, or smartphone. Visual prompting can take the form of a message and/or input field provided to the user on a display. The input field can be provided as part of a graphical user interface provided on the display of a computer(s) or computing device(s) which provides one or more data entry fields, check boxes, buttons, toggles, sliders, or pull-downs which allow the user to input information related to measuring and recording images from a microscope as depicted in the figures or as implemented in other variations and designs known in the computer engineering arts. Auditory prompting can take the form of speech or a recording broadcast from a speaker which prompts the user to enter the information. Inputting steps can be performed through traditional inputting means such as a physical keyboard or a keyboard projected on a display, such as a touchscreen. The keyboard can be a QWERTY keyboard or a condensed keyboard commonly used in electronic devices such as cell phones. Inputting can also be performed through the user providing speech which is inputted through a microphone of the computer(s) or computing device(s) and recognized by speech recognition algorithms programmed on the computer or computing device. Outputting steps can be formed through a visual output device such as a display on the computer(s) or computing device(s).

Computer-executable code or instructions for performing method steps described or depicted herein can be implemented as software or an application capable of being run on the computer(s) or computing device(s). The computer-executable code or instructions can be installed on the computer(s) or computing device(s) during manufacture as software, or implemented as firmware or hardware (e.g., circuitry), or some combination of these. The computer-executable code or instructions can be configured to be downloadable onto the memory of the computer(s) or computing device(s) from a cloud storage source available on the Internet, such as an application retail source (e.g., "app store") capable of being accessed from a mobile phone, tablet, laptop, gaming device, desktop computer, or other programmable device having components or features capable of performing the method steps described above. Examples of suitable internet-accessible sources include the Apple Store, Google Play, and other sites that make software applications and other downloads available for purchase or license. The computer-executable code or instructions can also be hosted on a server or servers accessible to users through a network connection, or can be distributed between a server and an application installed on a user's computer(s) or device(s).

The computer-readable code, computer-readable instructions, computer-executable instructions, or "software" can be organized into routines, subroutines, procedures, objects, methods, functions, or any other organization of computer-executable instructions that is known or becomes known to a skilled artisan in light of this disclosure, and can be programmed in any suitable programming language, including PHP, HTML, XML, XHTML, JavaScript, C, C#, C++, Java, Python, Perl, Ruby, Swift, Visual Basic, and Objective C. By such programming, the computer-readable code, computer-readable instructions, computer-executable instructions, or "software" instruct one or more processors of the computer(s) or computing device(s) to carry out the operations and commands of the application. Inputted information related to the operation of a microscope (e.g., objective power, ocular power, calibration factor) or recording and/or broadcasting images taken from the microscope can be stored in the computer(s) or computing device(s)'s memory. The memory can be implemented through non-transitory computer-readable storage media such as RAM. As used in the context of this specification, a "non-transitory computer-readable storage medium (or media)" may include any kind of computer memory, including magnetic storage media, optical storage media, nonvolatile memory storage media, and volatile memory. Non-limiting examples of non-transitory computer-readable storage media include floppy disks, magnetic tape, conventional hard disks, CD-ROM, DVD-ROM, BLU-RAY, Flash ROM, memory cards, optical drives, solid state drives, flash drives, erasable programmable read only memory (EPROM), electrically erasable programmable read-only memory (EEPROM), non-volatile ROM, and RAM.

In one implementation, a computer system for performing the method steps includes 1) one or more computer that is located remotely from a user and connected to the Internet and to each other and 2) a computer or computing device accessible to the user that can communicate with the remote computer(s) through a network. The remote computer(s) can be a fixed position computer, and the user's computer or computing device can be fixed such as a desktop computer or mobile/portable. The user's computer or device can be a desktop computer, laptop, tablet, gaming device, PDA, or smartphone that can access or display the graphical user interfaces depicted in FIGS. 1-21 and FIGS. 39-44. The graphical user interfaces can be downloaded together as an application from cloud storage services providing retail application downloading to the user's computer or computing device, or can be hosted on a remote computer which acts as a web server and accessed through the internet as webpages through an Internet browser on the user's computer or computing device. In one implementation, the remote computer(s) function as a streaming server or servers which transmit microscopic images, video, and/or related audio captured from the user's computer or computing device to the computers or computing devices of another user or other users observing the usage of the microscope as an audience. The remote computer(s) can include a set of computer-executable instructions stored in memory which can be used to transmit and distribute the video, images, or audio recordings of a broadcast related to the usage of a microscope captured from a user's device to other user devices. In some implementations, the user's computer or computing device serves as a streaming server instead of the remote computer(s). The methods need not be limited to one particular distribution of functions between those hosted on the user's computer or computer device and those hosted remotely; multiple configurations hosted on one or more computers are contemplated.

Additional embodiments include a computer, computing device, or system or combination thereof capable of carrying out the method and its implementations. The computer, computing device, system or combination thereof can include one or more processors capable of executing the computer-readable code, computer-readable instructions, computer-executable instructions, or "software", one or more interface capable of providing input or output, one or more memories and a set of instructions (e.g., software) stored in a memory or memories of the computer, computing device, or system or combination thereof for carrying out the method. The computer, computing device, or system or combination thereof can include one or more stand-alone computer, such as a desktop computer, a portable computer or personal electronic device, such as a tablet, laptop, PDA, gaming device, or smartphone, or a set of computers or devices connected through a network including a client-server configuration and one or more database servers. The network can use any suitable network protocol, including IP, UDP, or ICMP, and may be any suitable wired or wireless network including any local area network, wide area network, Internet network, telecommunications network, Wi-Fi enabled network, or BLUETOOTH® enabled network. Other protocols include Hypertext Transfer Protocol (HTTP), extensible markup language (XML), extensible hypertext markup language (XHTML), or a Wireless Application Protocol (WAP) protocol. In this way, one or more steps of the methods can be distributed across the system or combination, or performed on only one computer or computing device, according to specific applications or designs.

Computers, computing devices, or systems thereof described herein can include a variety of components known in the art, including one or more processor, a volatile memory, a non-volatile memory, standard I/O interfaces such as a universal serial bus (USB) port, an HDMI or HDMI ARC port, an optical port, an ethernet port, and/or a serial port, a hard drive, a disk drive, a CD-ROM drive, a motherboard, a printed circuit board (PCB), circuitry for enabling a wireless connection or communication to another device, such as a BLUETOOTH® board, a Wi-Fi board, or a transmitter-receiver for mobile telecommunications, a data bus, an address bus, a control bus, and/or one or more user interface devices including a display, keyboard, keypad, trackpad, mouse, control panel, touch screen display, speaker, camera, and/or microphone. The computers, computing devices, or systems thereof can be equipped with an operating system implemented as software or firmware. As can be appreciated, the computers, computing devices, or systems may differ in their inclusion, exclusion, or configuration of components according to their individual applications or designs.

The present disclosure has described particular implementations having various features. In light of the disclosure provided above, it will be apparent to those skilled in the art that various modifications and variations can be made without departing from the scope or spirit of the disclosure. One skilled in the art will recognize that the disclosed features may be used singularly, in any combination, or omitted based on the requirements and specifications of a given application or design. When an implementation refers to "comprising" certain features, it is to be understood that the implementations can alternatively "consist of" or "consist essentially of" any one or more of the features. Other implementations will be apparent to those skilled in the art from consideration of the specification and practice of the disclosure.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the disclosure fall within the scope of the disclosure. Further, all of the references cited in this disclosure including patents, published applications, and non-patent literature are each individually incorporated by reference herein in their entireties and as such are intended to provide an efficient way of supplementing the enabling disclosure as well as provide background detailing the level of ordinary skill in the art.

The invention claimed is:

1. A method of viewing a live image from a microscope through a camera lens of a first personal electronic device, the method comprising:
   receiving one or more optic powers and a calibration factor of a microscope taking the live image entered into a first graphical user interface displayed on a screen of the first personal electronic device, and
   projecting a measurement tool designed to measure dimensions in an x-axis and y-axis on a second graphical user interface displayed on the screen of the first personal electronic device with units of measurement based on the optic powers and the calibration factor entered into a formula which determines the units of measurement of the measurement tool.

2. The method of claim 1, wherein the one or more optic powers comprise an objective power and an ocular power.

3. The method of claim 1, wherein the units of measurement are chosen from units comprising centimeters, millimeters, and micrometers.

4. The method of claim 1, further comprising calibrating the measurement tool by capturing a microscopic image of a measurement scale, and adjusting the calibration factor so that graduations of the measurement scale correspond in distance therebetween with graduations of the measurement tool.

5. The method of claim 1, further comprising displaying a magnification power after the one or more optic powers of the microscope are entered.

6. The method of claim 1, further comprising sharing the live image with a second personal electronic device or multiple personal electronic devices by streaming the live image.

7. The method of claim 6, wherein the live image is streamed from the first personal electronic device to the second personal electronic device in a manner that allows audio or text communication between a user of the first personal electronic device and a user of the second personal electronic device.

8. The method of claim 7, wherein the streaming comprises sharing a URL hyperlink hosting a streamed image between the first personal electronic device and the second personal electronic device.

9. The method of claim 6, wherein the live image is streamed from the first personal electronic device to multiple personal electronic devices.

10. The method of claim 9, wherein the streaming comprises sharing a URL hyperlink hosting a streamed image between the first personal electronic device and the multiple personal electronic devices.

11. One or more non-transitory, computer-readable storage media having instructions for execution by one or more processors, the instructions programmed to cause the one or more processors to execute steps of a method of viewing a live image from a microscope through a camera lens of a first personal electronic device, the steps comprising:
   receiving one or more optic powers and a calibration factor of a microscope taking the live image entered into a first graphical user interface displayed on a screen of the first personal electronic device, and
   projecting a measurement tool designed to measure dimensions in an x-axis and y-axis on a second graphical user interface displayed on the screen of the first personal electronic device with units of measurement based on the optic powers and the calibration factor entered into a formula which determines the units of measurement of the measurement tool.

12. The one or more non-transitory, computer-readable storage media of claim 11, wherein the one or more optic powers comprise an objective power and an ocular power.

13. A computer or computer system, comprising:
   one or more processors designed to execute instructions; and
   one or more non-transitory, computer-readable memories storing program instructions for execution by the one or more processors, the instructions programmed to cause the one or more processors to execute steps of a method of viewing a live image from a microscope through a camera lens of a first personal electronic device, the steps comprising:
   receiving one or more optic powers and a calibration factor of a microscope taking the live image entered into a first graphical user interface displayed on a screen of the first personal electronic device, and
   projecting a measurement tool designed to measure dimensions in an x-axis and y-axis on a second graphical user interface displayed on the screen of the first personal electronic device with units of measurement based on the optic powers and the calibration factor entered into a formula which determines the units of measurement of the measurement tool.

14. The computer or computer system of claim 13, wherein the one or more optic powers comprise an objective power and an ocular power.

* * * * *